US011483367B2

(12) United States Patent
Vu et al.

(10) Patent No.: US 11,483,367 B2
(45) Date of Patent: Oct. 25, 2022

(54) METHODS AND SYSTEMS FOR REDUCING LATENCY ON A COLLABORATIVE PLATFORM

(71) Applicant: ScreenBeam Inc., Santa Clara, CA (US)

(72) Inventors: Chuong Vu, Cupertino, CA (US); Mike Ehlenberger, San Jose, CA (US); Wei Li, Stockton, CA (US); Dean Chang, Sunnyvale, CA (US); Chuang Li, Saratoga, CA (US)

(73) Assignee: ScreenBeam Inc., Santa Clara, CA (US)

( * ) Notice: Subject to any disclaimer, the term of this patent is extended or adjusted under 35 U.S.C. 154(b) by 0 days.

(21) Appl. No.: 17/105,419

(22) Filed: Nov. 25, 2020

(65) Prior Publication Data

US 2021/0160302 A1 May 27, 2021

Related U.S. Application Data

(60) Provisional application No. 62/941,677, filed on Nov. 27, 2019.

(51) Int. Cl.
*H04L 65/80* (2022.01)
*H04L 65/75* (2022.01)
*H04L 67/131* (2022.01)

(52) U.S. Cl.
CPC ............ *H04L 65/80* (2013.01); *H04L 65/762* (2022.05); *H04L 67/131* (2022.05)

(58) Field of Classification Search
CPC ....... H04L 65/80; H04L 65/602; H04L 67/38; H04L 9/40; H04L 67/01; H04L 67/131; H04L 65/762
See application file for complete search history.

(56) References Cited

U.S. PATENT DOCUMENTS 6,343,313 B1 1/2002 Salesky et al.
10,560,499 B2 2/2020 Vu et al.
(Continued)

FOREIGN PATENT DOCUMENTS

EP           1526445 A2   4/2005
WO   WO-2012088419 A1   6/2012
WO   WO-2014185690 A1   11/2014

OTHER PUBLICATIONS

International Search Report & Written Opinion dated Feb. 26, 2021 in Int'l PCT Patent Appl. Serial No. PCT/US2020/062427.
(Continued)

*Primary Examiner* — Wing F Chan
*Assistant Examiner* — Billy H Ng
(74) *Attorney, Agent, or Firm* — Eversheds Sutherland (US) LLP; Nicola A. Pisano; Robert D. Ward

(57) ABSTRACT

Systems and methods for reducing latency on a collaborative platform are provided. The collaborative platform involves a display, a moderator device, one or more member devices, and a receiver in communication with the display, the moderator device, and the one or more member devices. To reduce latency of the collaborative platform, the receiver generates an overlay image based on user input received from the display, as well as user type of the user input, generates an overlaid image based on the overlay image, and transmits the overlaid image for display, while a collaboration application generates new real image(s) based on the user input for display. The overlaid image generated may be indicative of actual user input as well as predicted user input using extrapolation and/or machine learning.

20 Claims, 23 Drawing Sheets

(56) References Cited

U.S. PATENT DOCUMENTS

| | | | |
|---|---|---|---|
| 2005/0036509 A1 | 2/2005 | Acharya et al. | |
| 2005/0273510 A1 | 12/2005 | Schuh | |
| 2006/0031779 A1 | 2/2006 | Theurer et al. | |
| 2007/0176893 A1* | 8/2007 | Sato | H04L 67/38 345/156 |
| 2007/0261102 A1 | 11/2007 | Spataro et al. | |
| 2009/0027397 A1* | 1/2009 | Frisken | G06K 9/00416 345/442 |
| 2010/0333127 A1 | 12/2010 | Scott et al. | |
| 2011/0154192 A1 | 6/2011 | Yang et al. | |
| 2011/0246552 A1 | 10/2011 | Nicholson et al. | |
| 2011/0271129 A1 | 11/2011 | Flannagan et al. | |
| 2012/0272147 A1 | 10/2012 | Strober | |
| 2014/0103104 A1 | 4/2014 | Jover | |
| 2014/0108506 A1 | 4/2014 | Borzycki et al. | |
| 2014/0141725 A1 | 5/2014 | Jesme et al. | |
| 2014/0173701 A1 | 6/2014 | Albouyeh et al. | |
| 2014/0192058 A1* | 7/2014 | Kodama | G06F 3/04883 345/442 |
| 2014/0330732 A1 | 11/2014 | Grignon | |
| 2014/0337769 A1 | 11/2014 | Kim et al. | |
| 2014/0351449 A1 | 11/2014 | Kramarenko et al. | |
| 2015/0089452 A1* | 3/2015 | Dorninger | G06F 3/0488 715/848 |
| 2015/0149929 A1 | 5/2015 | Shepherd et al. | |
| 2015/0188838 A1 | 7/2015 | Bhattacharya et al. | |
| 2015/0326654 A1* | 11/2015 | Lee | H04L 67/104 709/204 |
| 2016/0295167 A1 | 10/2016 | Sakurai | |
| 2017/0052755 A1 | 2/2017 | Miki | |
| 2017/0195374 A1* | 7/2017 | Vu | H04W 4/08 |
| 2017/0351757 A1 | 12/2017 | Strober | |
| 2018/0247550 A1 | 8/2018 | Lu et al. | |
| 2019/0121599 A1* | 4/2019 | Locascio | G06T 11/60 |
| 2019/0155498 A1* | 5/2019 | Angelov | G06K 9/52 |
| 2020/0090536 A1 | 3/2020 | Xiong et al. | |
| 2020/0177650 A1 | 6/2020 | Vu et al. | |
| 2020/0204606 A1* | 6/2020 | Papalini | H04L 65/608 |
| 2021/0153801 A1* | 5/2021 | Tsoi | G06K 9/6259 |

OTHER PUBLICATIONS

Barkay, et al., Evaluating Intel.RTM. Pro Wireless Display for Enterprise Use, Sep. 2013 (pp. 1-7).
Intel® Pro Wireless Display—White Paper, 12 pages (2015).
Intel.RTM. Pro WiDi Quick Start Guide, 1 page (2015).
Intel.RTM. Pro Wireless Display Implementation Guide, Version 2.4, 52 pages (Nov. 2015).
Intel.RTM. Pro Wireless Display Users Guide, Version 2.0, 28 pages (2015).
International Search Report & Written Opinion dated Apr. 5, 2017 in Int'l PCT Patent Appl Serial No. PCT/US2016/068989, 9 pages.
NetSupport School, Product Manual—Version 12.00, 2015, (382 pages).
NetSupport School, Tutor for Android Manual, 2015 (63 pages).
Samsung AllShare Cast Dongle User Guide, 2013, (82 pages).
U.S. Appl. No. 14/986,468 / U.S. Pat. No. 10,560,499, filed Dec. 31, 2015 / Feb. 11, 2020.
U.S. Appl. No. 16/551,668, filed May 26, 2019.
U.S. Appl. No. 16/786,667, filed Feb. 10, 2020.

* cited by examiner

METHODS AND SYSTEMS FOR REDUCING LATENCY ON A COLLABORATIVE PLATFORM

CROSS-REFERENCE TO RELATED APPLICATIONS

This application claims priority to U.S. Provisional Patent Application No. 62/941,677, filed Nov. 27, 2019, the entire contents of which are incorporated herein by reference.

TECHNICAL FIELD

The present disclosure relates, in general, to methods and systems for generating an overlay image based on user input for at least temporary display to reduce latency on a collaborative platform.

BACKGROUND

Methods and products for projecting content both by wired connection and wirelessly over a network are well known in the art. One example is the Miracast® wireless display standard, certified by the Wi-Fi Alliance, which defines a protocol for displaying multimedia between devices using Wi-Fi CERTIFIED Wi-Fi Direct®. Implementing Wi-Fi Direct, Miracast® provides operations for negotiating video capabilities, setting up content protection, streaming content, and maintaining a video session. Unlike Bluetooth technology, Wi-Fi CERTIFIED Miracast® allows for sending up to 1080p HD, or even higher resolution video and thus is suitable for video streaming and screen to screen content projection. For example, Miracast® makes it possible to wirelessly stream video content from a laptop computer to a television display.

Undesirable latency of content projection systems arises during collaboration, for example, when making edits to the content being projected on a display, e.g., computing device, where the original data file is not stored. For example, in a classroom setting, a teacher's desktop may have an original data file stored thereon, which may be projected on a display in front of the classroom visible to the classroom of students using content projection systems known in the art. A receiver is typically used to transmit data between the teacher's desktop or the student's tablet, and the display. For example, the receiver may be coupled to the display via a USB cable for transferring user input data, and further coupled to the display via an HDMI cable for transferring image(s). Moreover, the receiver may communicate with the teacher's desktop and the student's tablet wirelessly over a network (e.g., local network, corporate network, or internet).

When the original file, e.g., a math problem, stored on the teacher's desktop is projected on the display, e.g., a touchscreen, the student may attempt to answer the math problem by drawing directly on the display. As the student begins to draw, e.g., the number "3," on the display, in order for the formation of the number "3" to start appearing on the display, input data representing the user input is transferred from the display via the USB cable to the receiver. The receiver then transmits the user input data via WiFi to the teacher's desktop, where the original file is stored. A processor on the teacher's desktop then modifies the original file based on the user input data, e.g., adding the number "3" to the math problem as the student draws it, thereby generating a new real image, which is transmitted via WiFi to the receiver. The receiver then transmits the new real image via the HDMI cable to the display so that the formation of number "3" is displayed on the display as the student draws it. The data flow from the display to the receiver to the teacher's desktop, back to the receiver, and then finally back to the display occurs continuously as the student draws on the display, and results in latency of the collaborative content projection system.

Therefore, it is desirable to provide systems and methods for reducing latency of the collaborative content projection system.

SUMMARY OF THE INVENTION

The present invention is directed to systems and methods for generating an overlay image based on user input for at least temporary display to reduce latency on a collaborative platform. For example, in accordance with one aspect of the invention, a method for reducing latency on a collaborative platform is provided. The method includes receiving, by a first device, e.g., a receiver, a first real image from a third device, e.g., a moderator device; receiving, by the first device, user input data indicative of user input on the second device, e.g., a display via a USB cable; transmitting, by the first device, the user input data to the third device; determining, by the first device, an overlay image based on the user input data; determining, by the first device, an overlaid image based on the overlay image and the first real image; and transmitting, by the first device, the overlaid image to the second device, e.g., via an HDMI cable, to cause the overlaid image to be displayed on the second device, e.g., via a touchscreen display.

Moreover, a portion of the overlay image of the overlaid image may be displayed on the second device for a predetermined period of time. For example, the predetermined period of time may be at least as long as the latency on the collaborative platform. For example, the overlay image may include a leading end and a trailing end, such that, as the leading end extends on the second device at a rate, the trailing end is removed from the second device at the rate. Alternatively, as a number of spatial coordinates of the leading end increases on the second device, a portion of spatial coordinates of the trailing end may be removed from the second device depending on the latency and/or the speed of the user input data.

In accordance with some aspects of the present invention, the overlay image determined by the first device may include a first portion of the overlay image indicative of the user input at the second device based on the user input data, and an extended, predicted portion of the overlay image based on the user input data. For example, the first device may predict the extended portion of the overlay image based on at least one of spatial or time coordinates of the user input data, e.g., via at least one of extrapolation, machine learning, artificial intelligence, or a neural network. For example, the first device may predict the extended portion of the overlay image based on a velocity of the user input data. The extended portion of the overlay image may include a curved portion formed of a plurality of finite line segments, such that predicting, by the first device, the extended portion of the overlay image includes predicting the curved portion based on an angle of each finite line segment of the plurality of finite line segments.

In addition, the user input data may include input type data indicative of at least one of thickness, color, or marker or eraser type. In accordance with one aspect of the present invention, the method further includes determining, by the first device, the input type based on the user input data and machine learning. For example, the input type may be determined by analyzing a pattern of spatial inputs of the user input data from the second device. Accordingly, the overlay image determined may be determined based on the determined input type.

In accordance with another aspect of the present invention, the method further may include receiving, by the first device, data indicative of the input type from the third device. For example, the first device may receive data indicative of the input type from an application running on the third device via a defined TCP port. Alternatively, the first device may receive data indicative of the input type from an operating system running on the third device via a user input back channel (UIBC) extension. The third device and the first device may communicate over a wireless connection.

Figure 1A:
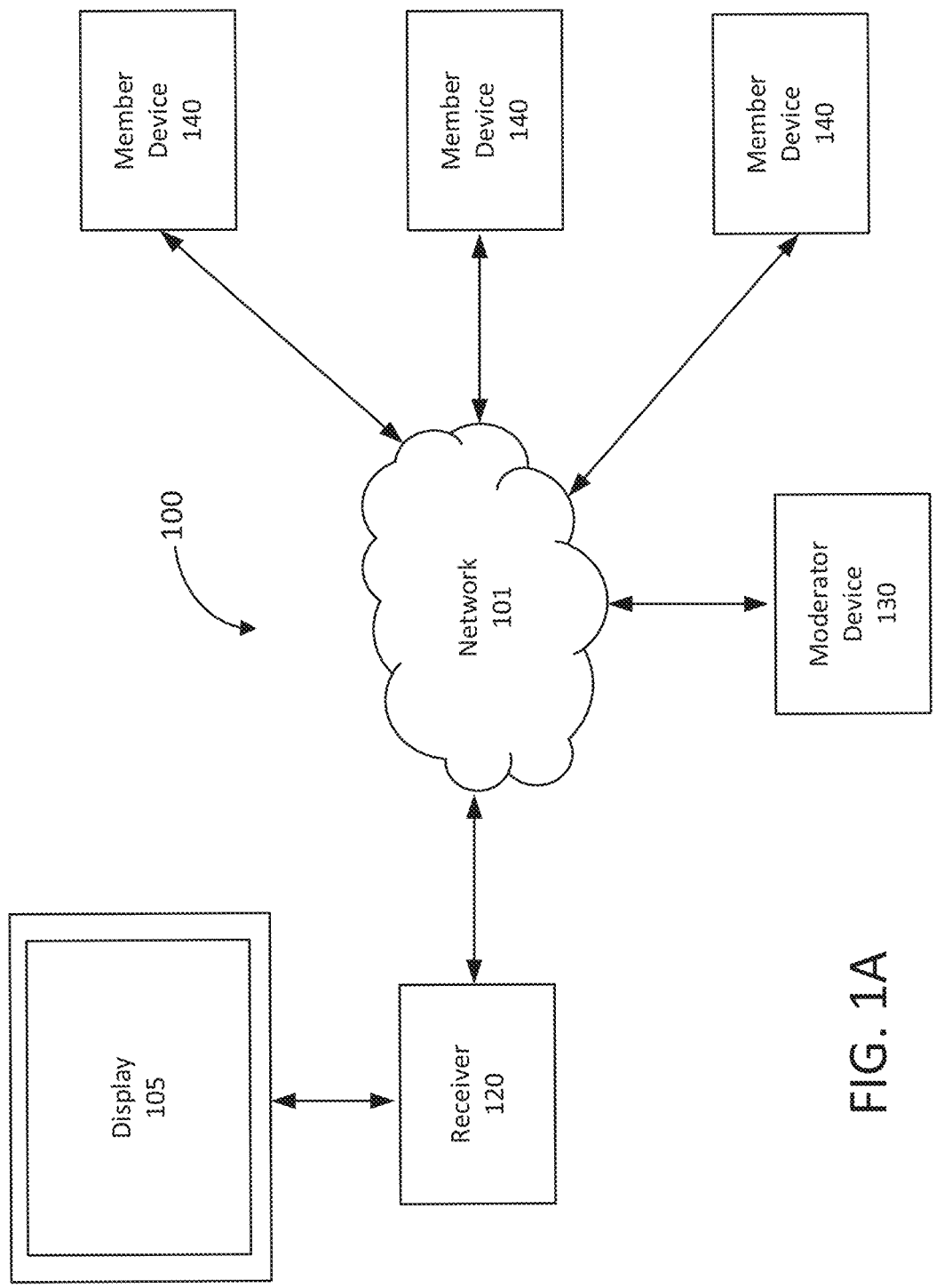
FIG. 1A is a block diagram of a collaborative platform in accordance with an illustrative embodiment of the present invention.

The foregoing and other features of the present invention will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE INVENTION

There are many instances in which a computer user may wish to share the display of his or her computer screen with others. For example, in connection with a classroom lesson being given in a classroom setting, a teacher may desire to display a problem to a classroom of students, and have a student solve the problem on the display, such that the student's efforts are visible to the entire classroom. For example, the problem may be stored in a computer file on the teacher's computer, and displayed on a main display visible to the classroom of students. A selected student may then perform work on the main display directly, such that their work is visible to the classroom of students. In such instances, it may be advantageous to quickly and easily display an overlay image illustrating the student's work over the original problem on the main display. As will be understood by a person of ordinary skill in the art, the principles of the present invention described herein may be used in settings other than the classroom, e.g., remotely across a campus or other geographical locations via WiFi or the internet, for conducting other collaborative efforts such as meetings or presentations.

The present invention is directed to a collaborative platform for use in, for example, a classroom setting or a product presentation meeting, to facilitate presenting materials in real time while reducing latency in the collaborative platform. For example, the present invention permits a user to provide user input, such as a marking on an original image being displayed, such that the user input is illustratively overlaid on the original image on a main display almost immediately after the user input is provided, and before a real image is able to be generated by the collaborative platform. The collaborative platform involves a main display, a moderator device, one or more member devices, and a receiver in communication with the display, the moderator device, and the one or more member devices. The moderator device may be used by a teacher/administrator and may store an original data file, and an original image may be displayed on the main display based on the original data file such that a student may edit the original data file by providing user input via the main display. The receiver is configured to run an overlay image generation application which generates an overlay image based on the user input provided by the student via the display, and displays the overlaid image over the original image while the collaborative platform updates the original data file based on the user input data for display on the main display. By displaying the overlaid image before displaying an updated image generated using the real data, the receiver reduces latency in the collaborative platform.

FIG. 1A is a block diagram of an illustrative collaborative platform constructed in accordance with the principles of the present invention. Collaborative platform 100 includes display 105, receiver 120, network 101 in which receiver 120 serves as the hub, moderator device 130 to be used by the moderator client, e.g., a teacher, and optionally, one or more member devices 140 to be used by the one or more member clients, e.g., students. Receiver 120 may be a ScreenBeam® Wireless Display Kit, available from Actiontec Electronics, Inc., Sunnyvale, Calif. In one preferred embodiment, receiver 120 is Miracast® aware and compatible. Although in FIG. 1A, three member devices 140 are depicted, as a person having ordinary skill in the art will understand, fewer or more than three member devices may be used in collaborative platform 100.

Figure 1B:
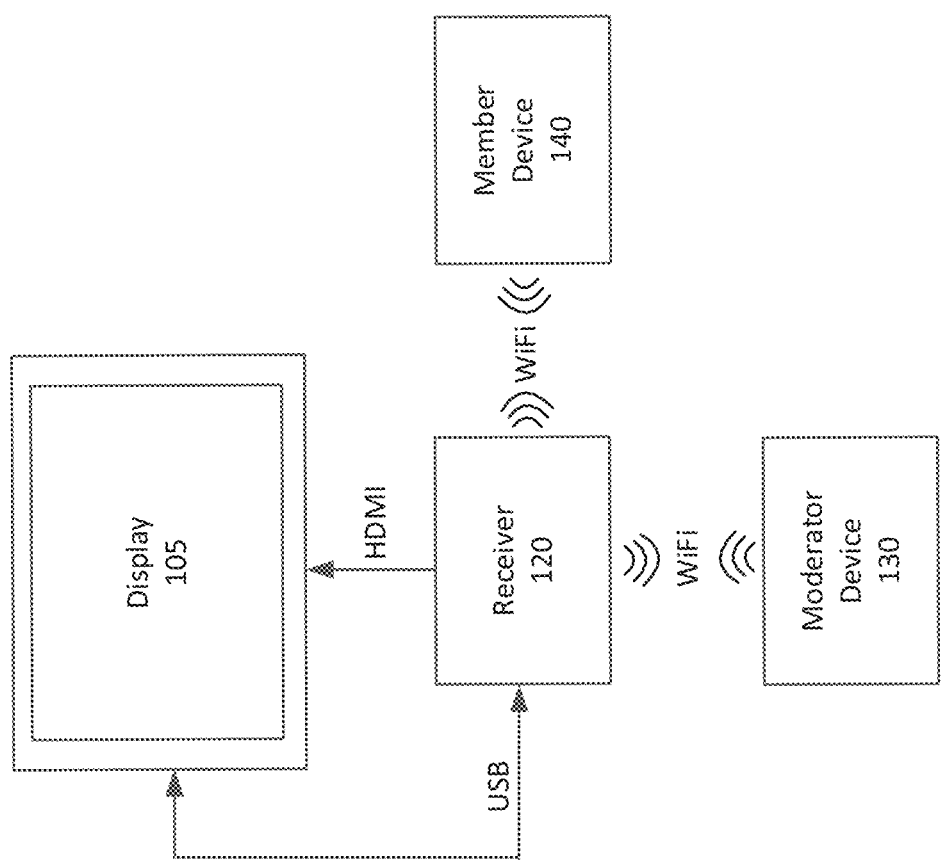
FIG. 1B is a block diagram of the collaborative platform of FIG. 1A illustrating various communication mechanisms in accordance with the principles of the present invention.

As shown in FIG. 1A, moderator device 130 and member devices 140 interact with receiver 120 wirelessly through network 101. As shown in FIG. 1B, network 101 may be based on wireless communication, such that moderator device 130 and member devices 140 interact with receiver 120 over WiFi or the internet. Network 101 may be a local peer-to-peer network, for example, a Wi-Fi peer-to-peer interface. Display 105 may be any suitable computing device, e.g., a touchscreen device, and provides an interface for presenting information received from receiver 120 to external systems, users, or memory, as well as for collecting user input directly via the interface of display 105, e.g., via touch sensors embedded on the interface. In an alternative embodiment, display 105 may comprise multiple individual displays, and even may constitute the displays associated with each of member devices 140 and/or moderator device 130. Similarly, when the user interacts directly on the screen of his or her member device 140 for making edits, member device 130 may be any suitable computing device as described above, e.g., a touchscreen device.

Receiver 120 may be coupled to display 105, by one or more wired connections. For example, as shown in FIG. 1B, receiver 120 and display 105 may connect using a universal serial bus (USB) cable for communicating user input data, and receiver 120 and display 105 may connect using a high-definition multimedia interface (HDMI) cable for communicating image(s). Alternative, receiver 120 and display 105 may connect using a wireless connection such as Bluetooth. Accordingly, receiver 120 receives an original image, e.g., still images, from moderator device 130 via WiFi, and passes along the original image provided by moderator device 130 to display 105 via the HDMI cable, which illustratively is shown on display 105. Thus, the local display of moderator device 130 and display 105 may display the same information (e.g., the same graphics, video, image, chart, presentation, document, program, application, window, view, etc.). In addition, receiver 120 receives user input data indicative of user input, from display 105 via the USB cable and/or a wireless connection such as Bluetooth, and passes along the user input data provided by display 105 to moderator device 130 via WiFi for processing.

Moderator device 130 processes the user input data provided by display 105, and modifies the original image stored in its memory based on the user input data received to generate an image for redistribution to receiver 120 via WiFi, and ultimately to display 105 via receiver 120. As will be understood by a person having ordinary skill in the art, the path of data flow—user input data from display 105 to receiver 120 via USB and/or Bluetooth, user input data from receiver 120 to moderator device 130 via WiFi, generation of real image based on the user input data by moderator device 130, real image from moderator device 130 to receiver 120 via WiFi, and real image from receiver 120 to display 105 via HDMI—will suffer from a time delay due to latency of the content projection system.

In accordance with one aspect of the present invention, moderator device 130 may designate member device 140 as the moderator as described in U.S. patent application Ser. No. 14/986,468, the entire contents of which is incorporated by reference herein. Accordingly, moderator device 130 may elect to share the screen of member device 140 on display 105, such that user input provided by a user on display 105 will be transmitted to member device 140 to modify the original file stored in the memory of member device 140.

In accordance with another aspect of the present invention, receiver 120 may be incorporated into moderator device 130. For example, receiver 120 may be incorporated into a laptop serving as moderator device 130. In accordance with another aspect of the present invention, any suitable arrangement of receiver 120 and display 105 may be employed. For example, receiver 120 and display 105 may be separate components or be combined into a single device.

Figure 2:
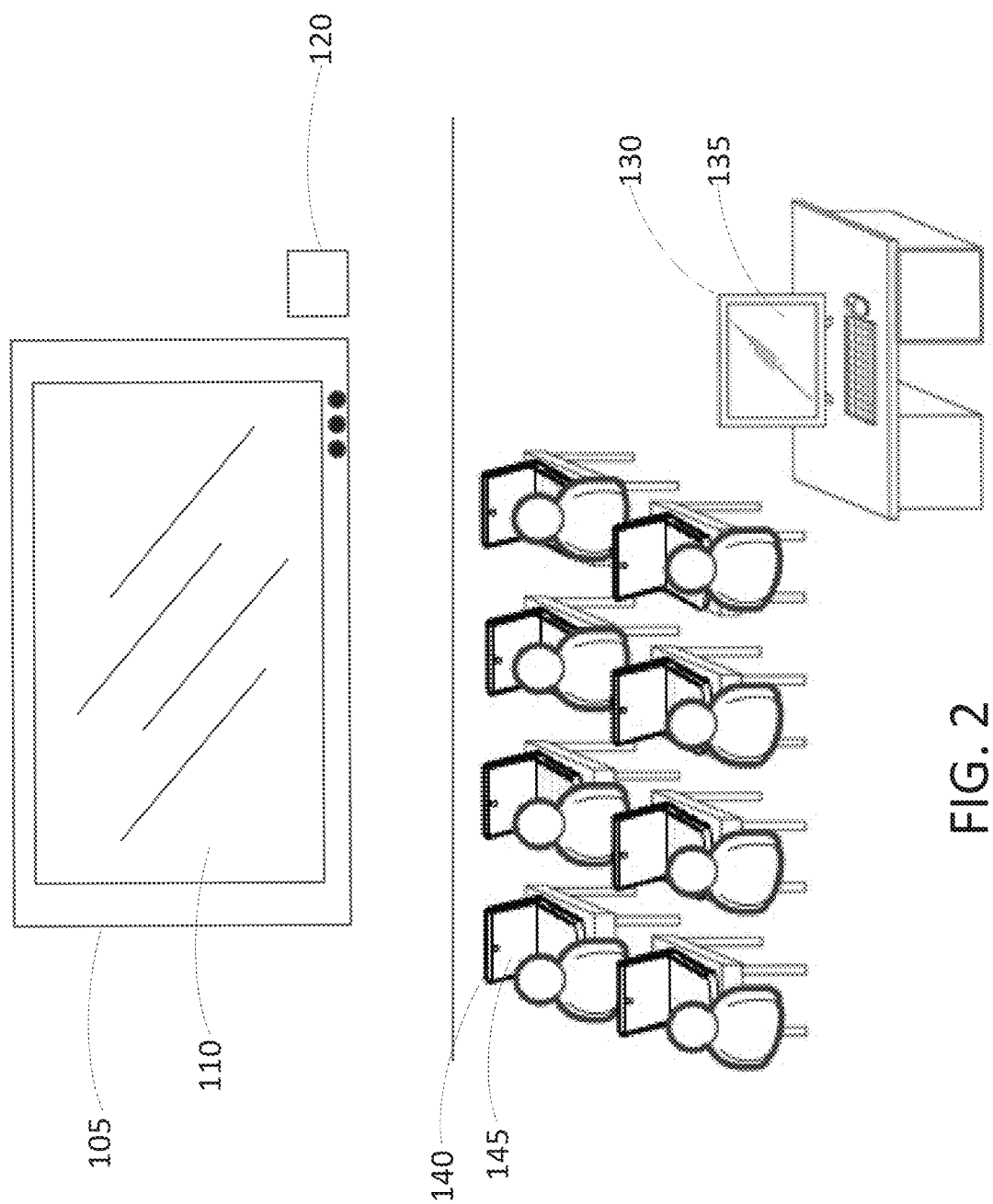
FIG. 2 is a diagram of a collaborative platform in an exemplary setting in accordance with one aspect of the present invention.

FIG. 2 depicts an embodiment of collaborative platform 100 constructed in accordance with the principles of the present invention for use in a classroom setting. As shown in FIG. 2, main display 105 is visible to the classroom of students and includes input/output device(s) 110, e.g., a touchscreen, such that a student can directly provide user input to display 105 in communication with receiver 120. In accordance with another aspect of the present invention, a student can directly provide user input to member device 140 via input/output device(s) 145 in communication with receiver 120, which will then be displayed on display 105. As shown in FIG. 2, the teacher's desktop computer is designated as moderator device 130 having input/output device(s) 135, e.g., a touchscreen, while wireless tablets located at each student's desk serve as member devices 140 having input/output device(s) 145, e.g., a touchscreen. As described above, moderator device 130 and member devices 140 wirelessly communicate with receiver 120.

In accordance with another aspect of the present invention, collaborative platform 100 may be used across multiple classrooms and/or other collaborative work environment settings. For example, moderator device 130 may be in a first classroom having a first display and a first plurality of member devices, and moderator device 130 may communicate, e.g., via WiFi, with a second display and a second plurality of member devices in a second classroom. Accordingly, a student in the second classroom may modify an image displayed on the second display, thereby modifying the original filed stored on moderator device 130 in the first classroom, such that the modification to the image is visible on the first and second displays in the first and second classrooms.

Figure 3A:
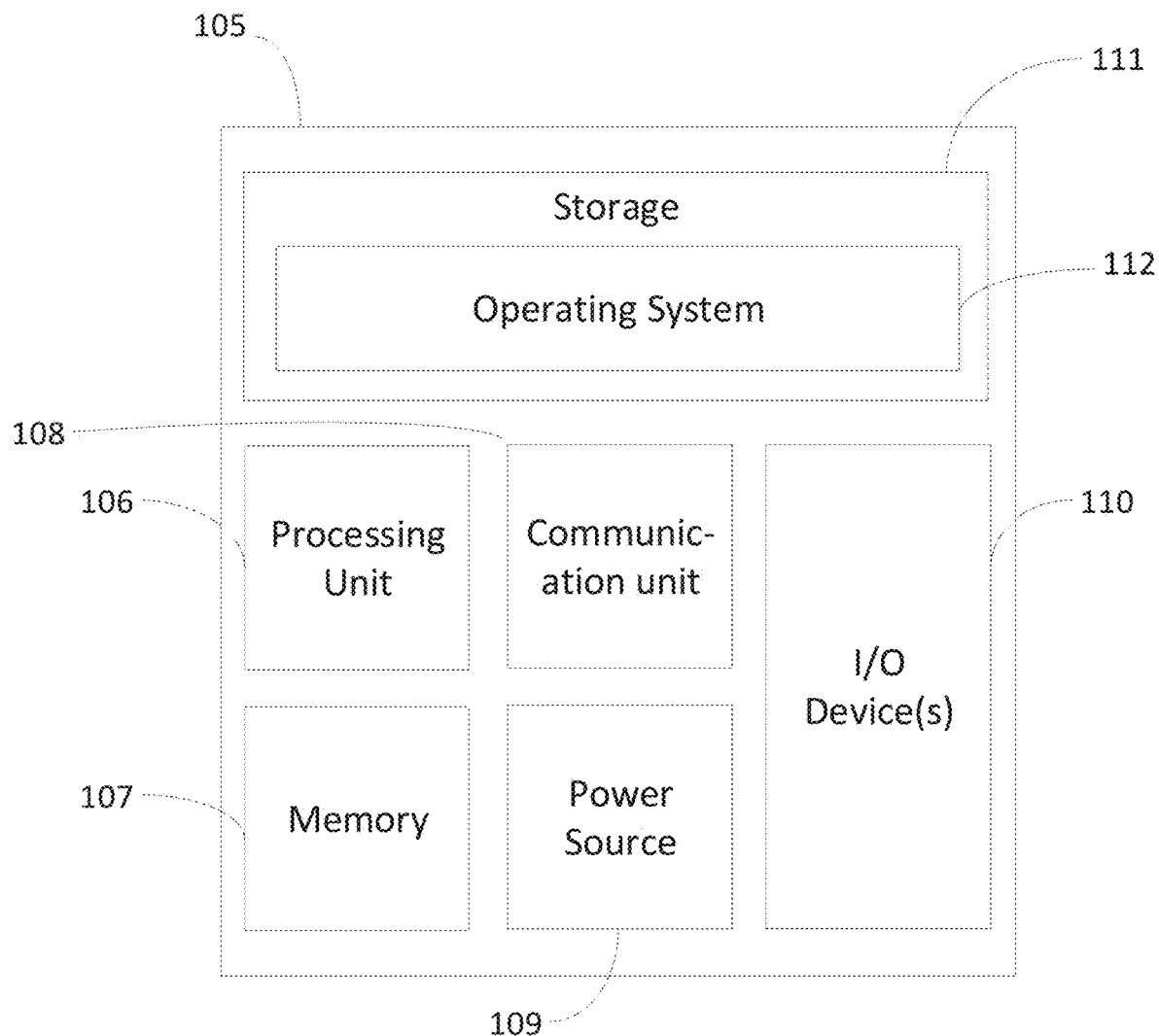
FIGS. 3A-3D are schematic views of the exemplary hardware and software components of an exemplary display, receiver, moderator device, and member device, respectively.

Referring now to FIGS. 3A-3D, exemplary functional blocks representing the hardware and software components of display 105, receiver 120, moderator device 130, and member device 140, respectively, are provided. Referring now to FIG. 3A, hardware and software components of display 105 may include processing unit 106, memory 107, storage 111, communication unit 108, power source 109, input/output (I/O) device(s) 110.

Processing unit 106 may be one or more processors configured to run operating system 112 and perform the tasks and operations of display 105 set forth herein. Memory 107 may include, but is not limited to, volatile (e.g. random-access memory (RAM)), non-volatile (e.g. read-only memory (ROM)), flash memory, or any combination thereof. Communication unit 108 may be any well-known communication infrastructure facilitating communication over any well-known wired or wireless connection. For example, communication unit 108 may transmit information, e.g., user input data, to receiver 120 of collaborative platform 100 via a USB cable and/or a wireless connection such as Bluetooth, and may receive information, e.g., an image, from receiver 120 via an HDMI cable. Power source 109 may be a battery or may connect display 105 to a wall outlet or any other external source of power. Storage 111 may include, but is not limited to, removable and/or non-removable storage such as, for example, magnetic disks, optical disks, or tape.

The input device of I/O device(s) 110 may be one or more devices coupled to or incorporated into display 105 for inputting data to display 105. For example, the input device of I/O device 110 may be a touch input device (e.g., touch pad or touch screen) or an array of location sensors, configured to receive user input from the user and generate user input data indicative of the user input. In addition, the input device of I/O device 110 may work in conjunction with a smart stylet that interacts with the array of location sensors. The output device of I/O device 110 may be any device coupled to or incorporated into display 105 for outputting or otherwise displaying images. Accordingly, I/O device(s) 110 may be a touchscreen for receiving and displaying images.

Operating system 112 may be stored in storage 111 and executed on processing unit 106. Operating system 112 may be suitable for controlling the general operation of display 105 to achieve the functionality of display 105 described herein. Display 105 may also optionally run a graphics library, other operating systems, and/or any other application programs. It of course is understood that display 105 may include additional or fewer components than those illustrated in FIG. 3A and may include more than one of each type of component.

Figure 3B:
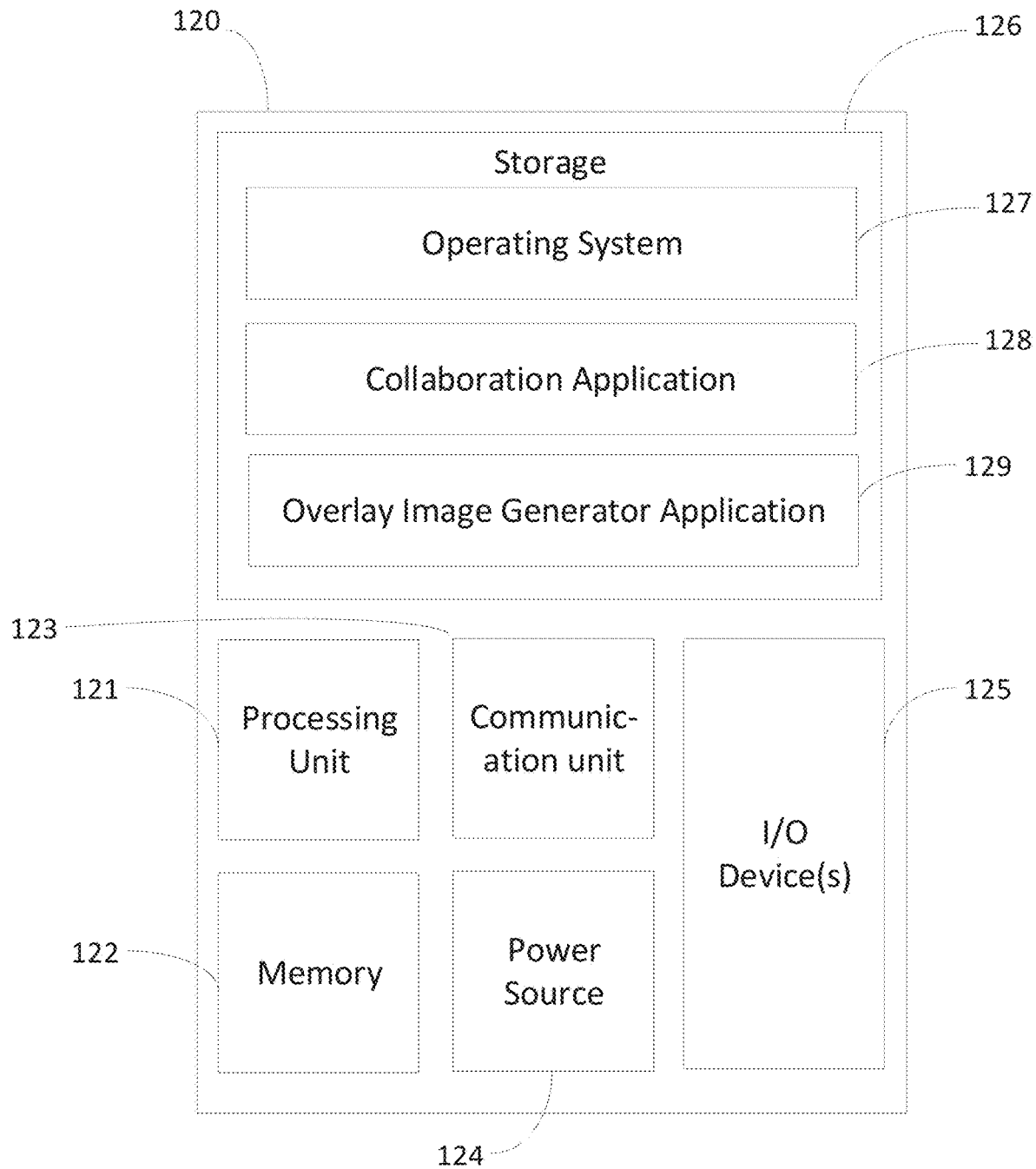

Referring now to FIG. 3B, hardware and software components of receiver 120 may include processing unit 121, memory 122, storage 126, communication unit 123, power source 124, input/output (I/O) device(s) 125.

Processing unit 121 may be one or more processors configured to run operating system 127, collaborative application 128, and overlay image generator application 129 and perform the tasks and operations of receiver 120 set forth herein. Memory 122 may include, but is not limited to, volatile (e.g. random-access memory (RAM)), non-volatile (e.g. read-only memory (ROM)), flash memory, or any combination thereof. Communication unit 123 may be any well-known communication infrastructure facilitating communication over any well-known wired or wireless connection. For example, communication unit 123 may receive information, e.g., user input data from display 105 via a USB cable and/or a wireless connection such as Bluetooth, and real images from moderator device 130 via WiFi, and may transmit information, e.g., image(s), to display 105 via an HDMI cable. Moreover, communication unit 123 may communicate both user input data and images to moderator device 130 and/or member devices 140 via network 101, e.g., WiFi. In accordance with one aspect of the present invention, communication unit 123 may receive information, e.g., data indicative of one or more user types of the user input from moderator device 130 via, e.g., a defined TCP port or a UIBC extension.

Power source 124 may be a battery or may connect receiver 120 to a wall outlet or any other external source of power. Storage 126 may include, but is not limited to, removable and/or non-removable storage such as, for example, magnetic disks, optical disks, or tape. The input device of I/O device(s) 125 may be one or more devices coupled to or incorporated into receiver 120 for inputting data to receiver 120. The output device of I/O device 110 may be any device coupled to or incorporated into receiver 120 for outputting or otherwise displaying images.

Collaboration application 128 may be stored in storage 126 and executed on processing unit 121. Collaboration application 128 may be a software application and/or software modules having one or more set of instructions suitable for performing the operations of receiver 120 set forth herein, including facilitating the exchange of information with moderator device 130. For example, collaboration application 128 may cause receiver 120 to receive user input data from display 105 via communication unit 123, e.g., via a USB cable and/or a wireless connection such as Bluetooth, and to pass along the user input data to moderator device 130 via communication unit 123, e.g., via WiFi. In addition, collaboration application 128 further may cause receiver device 130 to receive real images from moderator device 130 via communication unit 123, e.g. via WiFi, and to pass along an overlaid image based on the real image to display 105, e.g., via an HDMI cable. In accordance with another aspect of the present invention, collaboration application 128 may cause receiver 120 to receive data indicative of one or more user types from moderator device 130 via communication unit 123, e.g., a defined TCP port or a modified user input back channel (UIBC), as described in further detail below.

Overlay image generator application 129 may be stored in storage 126 and executed on processing unit 121. Overlay image generator application 129 may be a software application and/or software modules having one or more sets of instructions suitable for performing the operations of receiver 120 set forth herein, including facilitating the exchange of information with display 105, moderator device 130, and member devices 140. For example, overlay image generator application 129 may cause processing unit 121 of receiver 120 to process and analyze the user input data received from display 105 via collaboration application 128 and generate an overlay image based on the user input data, and generate an overlaid image based on the overlay image, and to transmit the overlaid image to display 105 for display via communication unit 123, e.g., via an HDMI cable. In addition, overlay image generator application 129 may cause receiver 120 to derive one or more user types based on the user input data received from display 105 via collaboration application 128, such that the overlay image is also generated based on the user type, as described in further detail below.

Alternatively, overlay image generator application 129 may cause receiver 120 to generate an overlay image based on the data indicative of one or more user types received from moderator device 130 via communication unit 123, e.g., a defined TCP port, instead of deriving one or more user types based on the user input data received from display 105, as described in further detail below. In accordance with another embodiment of the present invention, overlay image generator application 129 may cause receiver 120 to generate an overlay image based on the data indicative of one or more user types received from moderator device 130 via communication unit 123, e.g., a modified user input back channel (UIBC), instead of deriving one or more user types based on the user input data received from display 105, as described in further detail below.

Operating system 127 may be stored in storage 126 and executed on processing unit 121. Operating system 127 may be suitable for controlling the general operation of receiver 120 and may work in concert with overlay image generator application 129 to achieve the functionality of receiver 120 described herein. Receiver 120 may also optionally run a graphics library, other operating systems, and/or any other application programs. It of course is understood that receiver 120 may include additional or fewer components than those illustrated in FIG. 3B and may include more than one of each type of component.

Figure 3C:
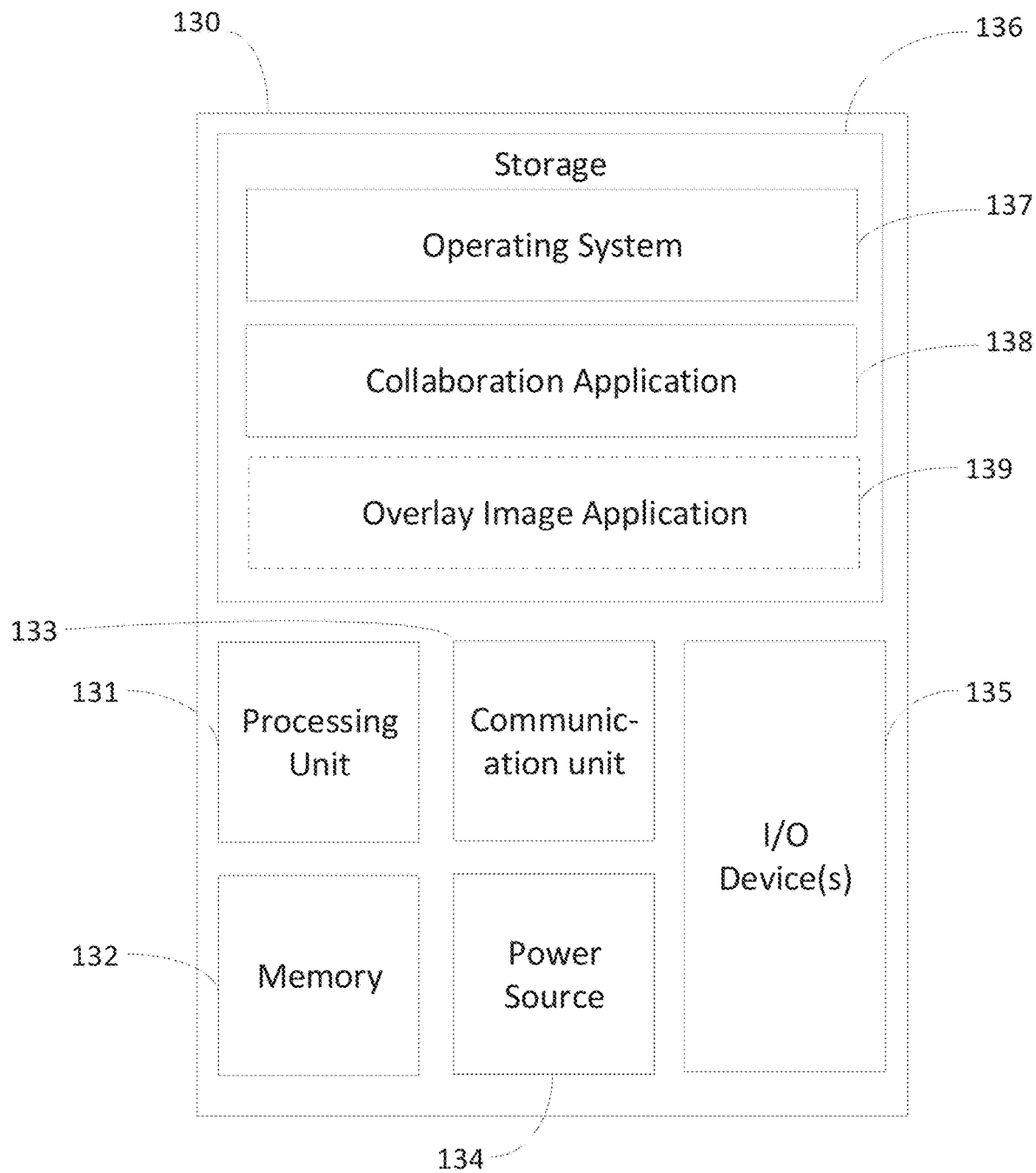

Referring now to FIG. 3C, hardware and software components of moderator device 130 may include processing unit 131, memory 132, storage 136, communication unit 133, power source 134, input/output (I/O) device(s) 135.

Processing unit 131 may be one or more processors configured to run operating system 137, collaboration application 138, and optional overlay image application 139 and perform the tasks and operations of moderator device 130 set forth herein. Memory 132 may include, but is not limited to, volatile (e.g. random-access memory (RAM)), non-volatile (e.g. read-only memory (ROM)), flash memory, or any combination thereof. Communication unit 133 may be any well-known communication infrastructure facilitating communication over any well-known wired or wireless connection. For example, communication unit 133 may receive information, e.g., user input data, from receiver 120 via WiFi, and may transmit information, e.g., image(s), to receiver 120 via WiFi. Power source 134 may be a battery or may connect moderator device 130 to a wall outlet or any other external source of power. Storage 136 may include, but is not limited to, removable and/or non-removable storage such as, for example, magnetic disks, optical disks, or tape.

The input device of I/O device(s) 135 may be one or more devices coupled to or incorporated into moderator device 130 for inputting data to moderator device 130. For example, the input device of I/O device 135 may be a touch input device (e.g., touch pad or touch screen) or an array of location sensors, configured to receive user input from the user and generate user input data indicative of the user input. In addition, the input device of I/O device 135 may work in conjunction with a smart stylet that interacts with the array of location sensors. The output device of I/O device 135 may be any device coupled to or incorporated into moderator device 130 for outputting or otherwise displaying images. Accordingly, I/O device(s) 135 may be a touchscreen for receiving and displaying images.

Collaboration application 138 may be stored in storage 136 and executed on processing unit 131. Collaboration application 138 may be a software application and/or software modules having one or more set of instructions suitable for performing the operations of moderator device 130 set forth herein, including facilitating the exchange of information with receiver 120. For example, collaboration application 138 may cause moderator device 130 to transmit a first real image from an original image file stored on storage 136 to receiver 120 via communication unit 133, e.g., via WiFi, for display via display 105. Further, collaboration application 138 may cause moderator device 130 to receive user input data from receiver 120 via communication unit 133, e.g., via WiFi. Collaboration application 138 further may cause processing unit 131 to process and analyze the user input data received from receiver 120 and to modify the original image file stored on storage 136 by generating a real image based on the user input data, and to store the real image on storage 136. Additionally, collaboration application 138 may cause moderator device 130 to transmit the real image, e.g., the real image stored on storage 136, to receiver 120 via communication unit 133, e.g., via WiFi, for display via display 105.

Optional overlay image application 139 may be stored in storage 136 and executed on processing unit 131. Overlay image application 139 may be a software application and/or software modules having one or more sets of instructions suitable for performing the operations of moderator device 130 set forth herein, including facilitating the exchange of information with receiver 120. For example, overlay image application 139 may cause processing unit 131 of moderator device 130 to derive user type data indicative of one or more user types from the user input data received by moderator device 130 through collaboration application 138, and to transmit the user type data to receiver 120 via communication unit 133, e.g., via a defined TCP port.

Operating system 137 may be stored in storage 136 and executed on processing unit 131. Operating system 137 may be suitable for controlling the general operation of moderator device 130 and may work in concert with collaboration application 138 and optional overlay image application 139 to achieve the functionality of moderator device 130 described herein. Moderator device 130 may also optionally run a graphics library, other operating systems, and/or any other application programs. It of course is understood that moderator device 130 may include additional or fewer components than those illustrated in FIG. 3C and may include more than one of each type of component. In accordance with one embodiment of the present invention, operating system 137 may cause processing unit 131 of moderator device 130 to derive user type data indicative of one or more user types from the user input received by moderator device 130 through collaboration application 138, and to transmit the user type data to receiver 120 via communication unit 133, e.g., via a modified user input back channel (UIBC).

Figure 3D:
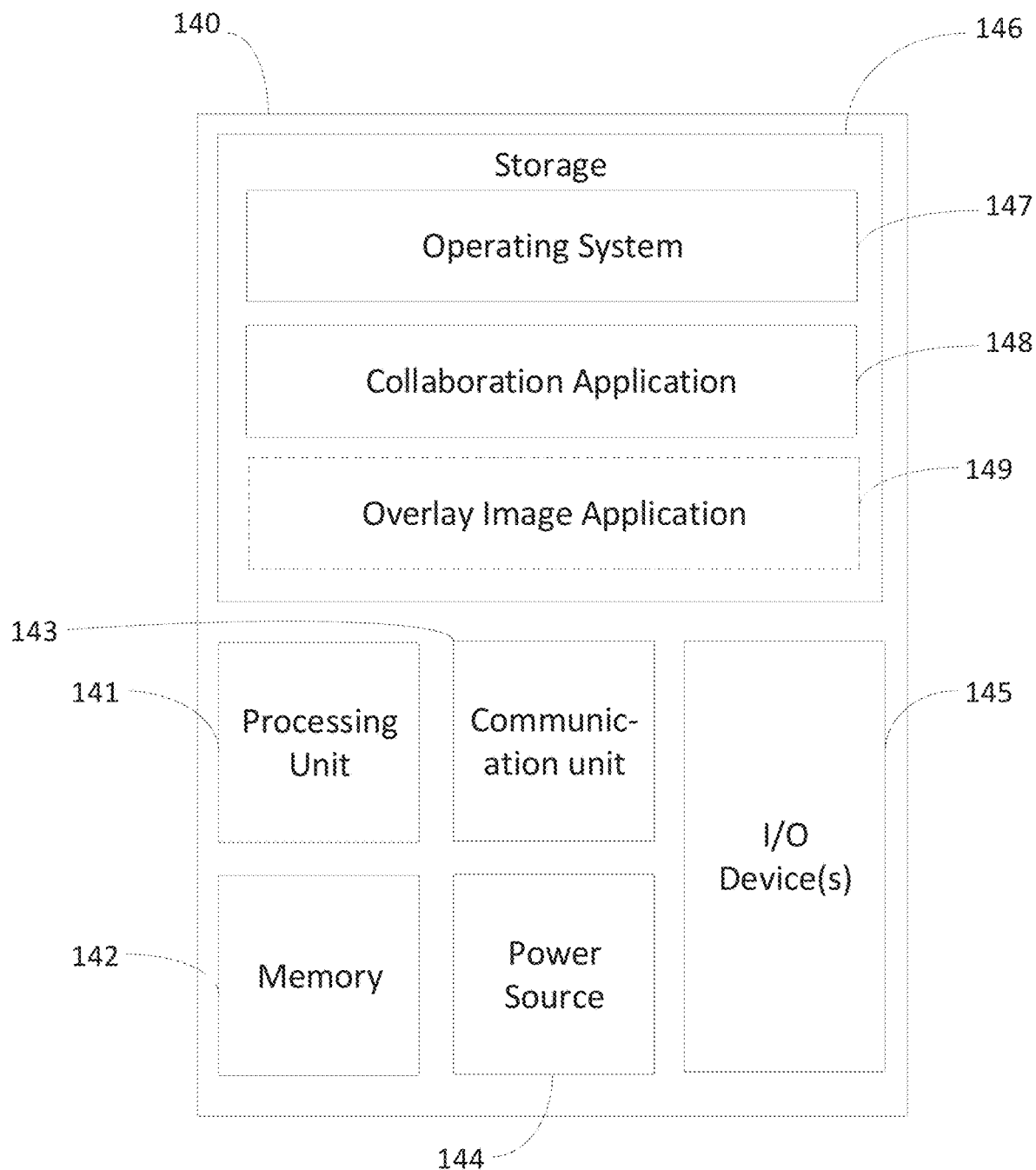

Referring now to FIG. 3D, hardware and software components of one or more member devices 140 may include processing unit 141, memory 142, storage 146, communication unit 143, power source 144, input/output (I/O) device(s) 145.

Processing unit 141 may be one or more processors configured to run operating system 147, collaboration application 148, and optional overlay image application 149 and perform the tasks and operations of member device 140 set forth herein. Memory 142 may include, but is not limited to, volatile (e.g. random-access memory (RAM)), non-volatile (e.g. read-only memory (ROM)), flash memory, or any combination thereof. Communication unit 143 may be any well-known communication infrastructure facilitating communication over any well-known wired or wireless connection. For example, communication unit 143 may transmit information, e.g., user input data, to receiver 120 of collaborative platform 100 via WiFi, and may receive information, e.g., image(s), from receiver 120 via WiFi. Power source 144 may be a battery or may connect member device 140 to a wall outlet or any other external source of power. Storage 146 may include, but is not limited to, removable and/or non-removable storage such as, for example, magnetic disks, optical disks, or tape.

The input device of I/O device(s) 145 may be one or more devices coupled to or incorporated into member device 140 for inputting data to member device 140. For example, the input device of I/O device 145 may be a touch input device (e.g., touch pad or touch screen) or an array of location sensors, configured to receive user input from the user and generate user input data indicative of the user input. In addition, the input device of I/O device 145 may work in conjunction with a smart stylet that interacts with the array of location sensors. The output device of I/O device 145 may be any device coupled to or incorporated into member device 140 for outputting or otherwise displaying images. Accordingly, I/O device(s) 145 may be a touchscreen for receiving and displaying images.

Collaboration application 148 may be stored in storage 146 and executed on processing unit 141. Collaboration application 148 may be a software application and/or software modules having one or more set of instructions suitable for performing the operations of member device 140 set forth herein, including facilitating the exchange of information with receiver 120. For example, collaboration application 148 may cause member device 140 to transmit user input data received via the input device of I/O device(s) 145 to receiver 120 via communication unit 143, e.g., via WiFi, for further transmission to moderator device 130. Further, collaboration application 148 may cause member device 140 to receive image(s) from receiver 120 via communication unit 133, e.g., via WiFi, for display via the output device of I/O device(s) 145.

Optional overlay image application 149 may be stored in storage 146 and executed on processing unit 141. Overlay image application 149 may be a software application and/or software modules having one or more sets of instructions suitable for performing the operations of member device 140 set forth herein, including facilitating the exchange of information with receiver 120. When member device 140 is dubbed as the moderator by moderator device 130 as described above, overlay image application 149 may operate similar to overlay image application 139.

Operating system 147 may be stored in storage 146 and executed on processing unit 141. Operating system 147 may be suitable for controlling the general operation of member device 140 and may work in concert with collaboration application 148 and optional overlay image application 149 to achieve the functionality of member device 140 described herein. Member device 140 may also optionally run a graphics library, other operating systems, and/or any other application programs. It of course is understood that member device 140 may include additional or fewer components than those illustrated in FIG. 3D and may include more than one of each type of component.

Figure 4A:
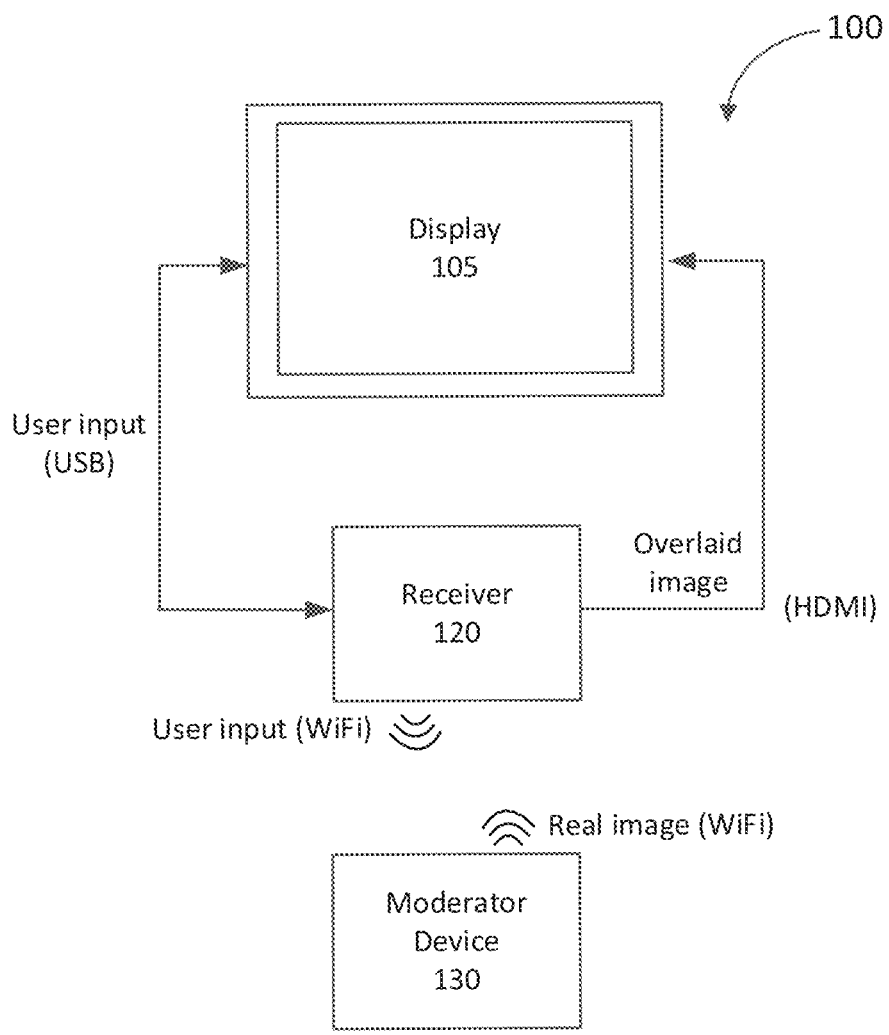
FIG. 4A is a block diagram of the collaborative platform in accordance with one aspect of the present invention.

Referring now to FIG. 4A, a block diagram of an exemplary embodiment of collaborative platform 100 in accordance with the principles of the present invention is provided. As shown in FIG. 4A, user input data may be transmitted from display 105 to receiver 120 via a wired connection, e.g., a USB cable, and/or a wireless connection such as Bluetooth. In addition, user input data and the real images may be communicated between receiver 120 and moderator device 130 across a wireless connection, e.g., WiFi. Further, the overlaid image based on the real image and the overlay image may be transmitted from receiver 120 to display 105 via a wired connection, e.g., an HDMI cable.

Figure 4B:
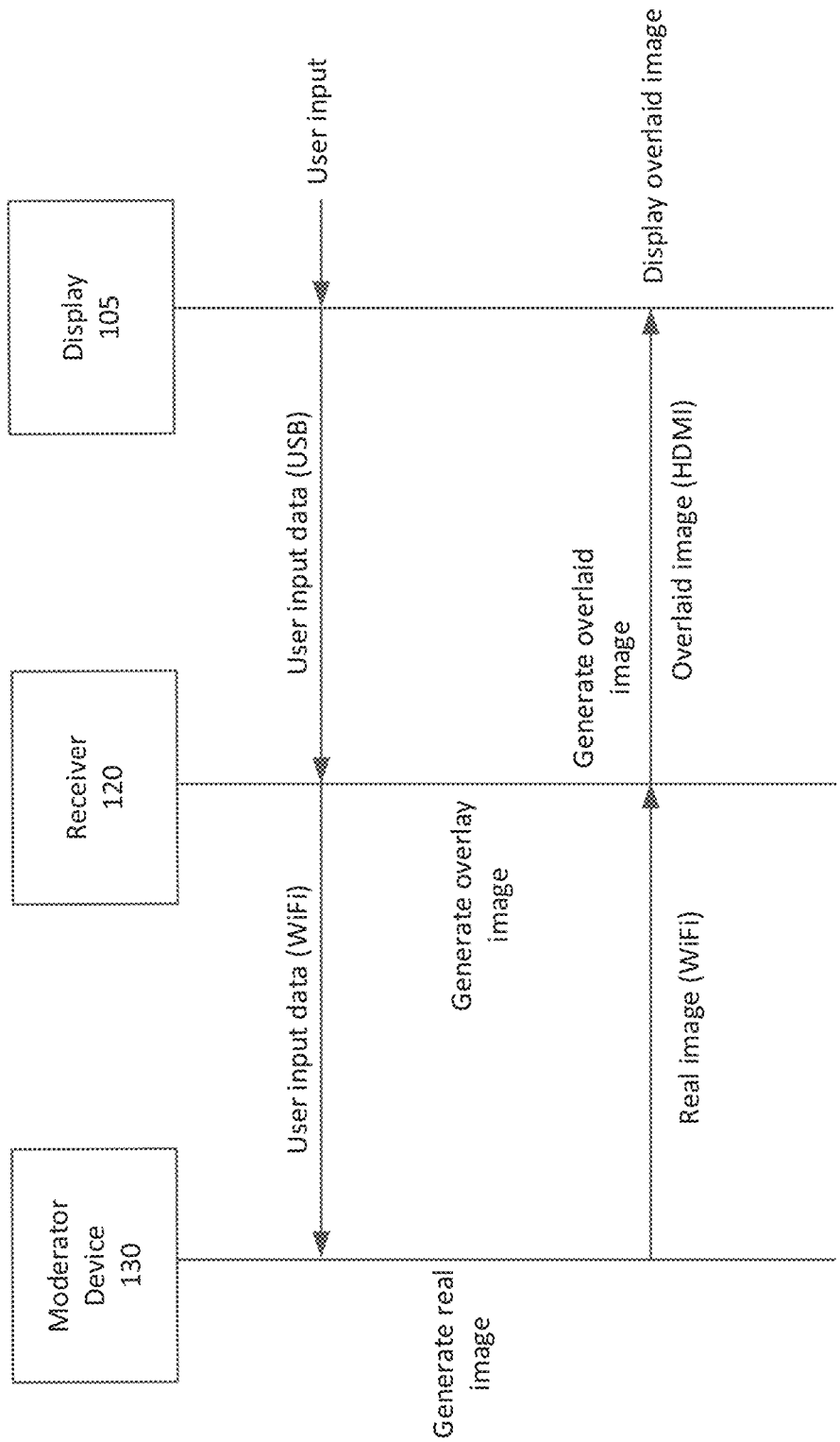
FIG. 4B is a sequence diagram for using the collaborative platform in accordance with the illustrative embodiment depicted in FIG. 4A.

Referring now to FIG. 4B, a sequence diagram for using collaborative platform 100 depicted in FIG. 4A is provided. As described above, collaboration platform 100 may run a collaboration application, e.g., third party application such as Microsoft Whiteboard available from Microsoft, Redmond, Wash., or Google Drive available from Google LLC, Mountain View, Calif., for displaying a first real image based on an original image file stored on moderator device 130, receiving user input, modifying the original image file stored on moderator device 130 based on the user input, and displaying a second real image based on the modified original image file. Specifically, as shown in FIG. 4B, a user may provide user input directly to display 105, e.g., a touchscreen. A first real image may already be displayed on display 105, e.g., a math problem, from an original image file stored on moderator device 130, or display 105 may initially be blank if the original image file stored on moderator device 130 is blank. The user input may be a pattern of interactions (e.g., clicks and drags) with the touchscreen of display 105 forming, e.g., a number "3" in the color red. The shape forming the number "3" is an example of the user input, and the color red is an example of a user type of the user input. Other possible user types may include, for example, different colors (e.g., gray, black, red, blue, etc.), thickness level (e.g., thin, normal, thick), or marker or eraser type, etc.

User input data based on the user input received by display 105 is then transmitted via wired connection, e.g., a USB cable, and/or a wireless connection such as Bluetooth, to receiver 120, which then passes along the user input data to moderator device 130 via a wireless connection, e.g., WiFi. Running the collaboration application, moderator device 130 modifies the original image file stored in memory therein based on the user input data, and generates a real image file corresponding to a real image, e.g., where the red "3" is superimposed on the math problem. Typically, the real image is then transmitted to receiver 120 via a wireless connection, e.g., WiFi, which then passes along the real image to display 105 via a wired connection, e.g., an HDMI cable, to be displayed. Accordingly, there is an undesirable delay between the time the user provides the user input to display 105 and when the real image reaches display 105, i.e., when the red "3" begins to appear on display 105. As will be understood by a person having ordinary skill in the art, the collaborative platform does not wait for, e.g., the entire number "3," to be drawn before generating the real image; instead, this process occurs continuously as the user draws the number "3."

In accordance with the principles of the present invention, collaboration platform 100 may run an overlay image generator application for generating an overlay image by receiver 120 based on the user input provided by the user, generating an overlaid image based on the overlay image and the real image received by moderator device 130, and displaying the overlaid image on the original image on display 105 to reduce latency of collaboration platform 100.

Specifically, as shown in FIGS. 4A and 4B, receiver 120 may generate overlay image based on the user input data, generate an overlaid image based on the overlay image and the real image received from moderator device 130, and transmit the overlaid image via a wired connection, e.g., an HDMI cable, to display 105 to be displayed over the original image displayed on display 105, thereby reducing latency of collaboration platform 100. In addition, receiver 120 may determine the user type of the user input by deriving data indicative of the user type from the user input data received from display 105 using, e.g., machine learning, artificial intelligence, or neural network, as described in further detail below with regard to FIGS. 7A and 7B. Accordingly, receiver 120 may generate overlay image based on both the user input data and the user type, as it determines the user type.

Figure 5A:
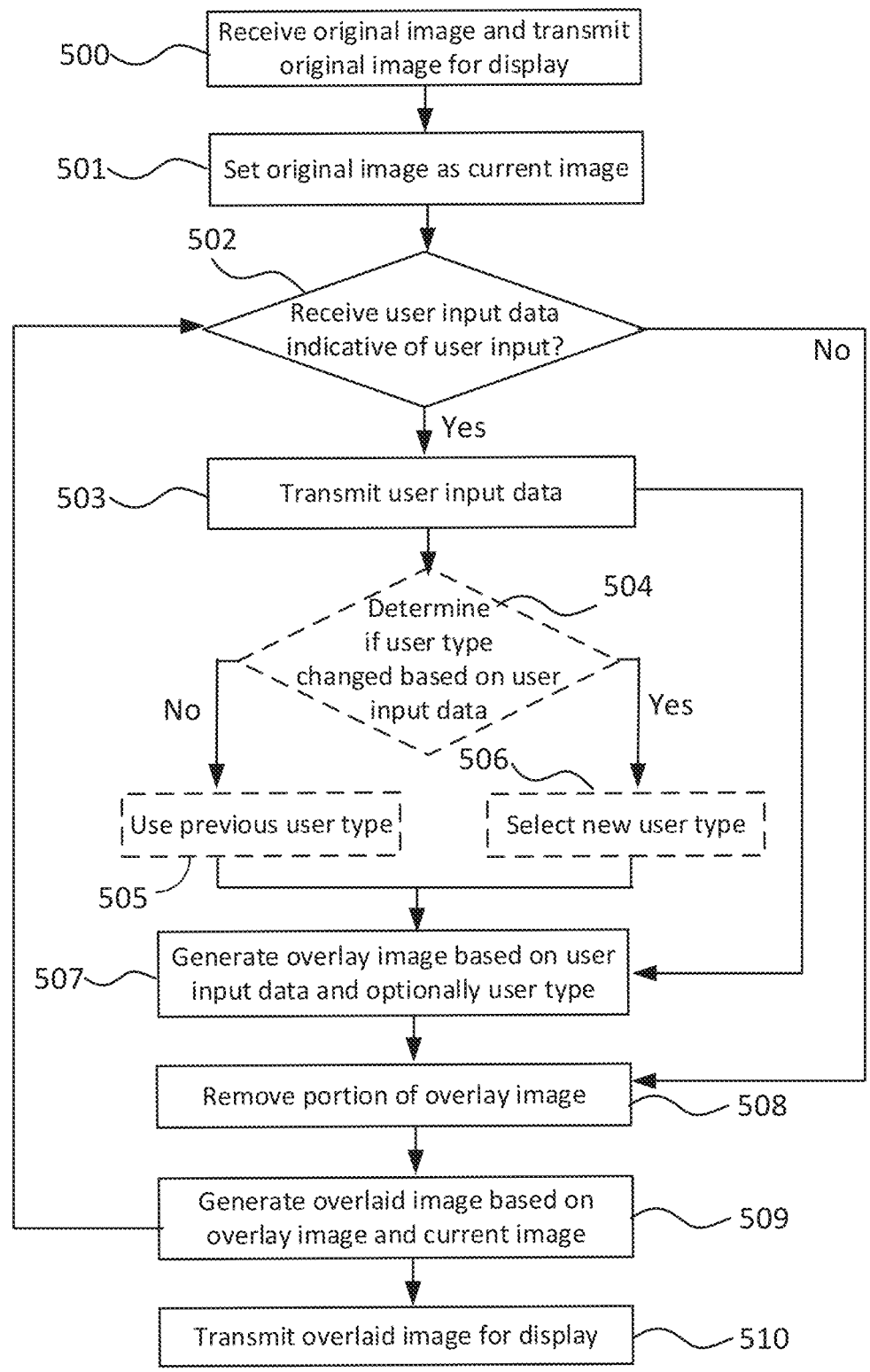
FIG. 5A is a flow chart illustrating exemplary steps of reducing latency on a collaborative platform in accordance with the principles of the present invention.

Referring now to FIG. 5A, a flowchart is illustrated detailing the data flow and decisions made in implementing the overlaid image generation functionality of receiver 120 of collaborative platform 100. As mentioned above, receiver 120 of collaborative platform 100 may be used to generate an overlay image based on user input, and generate an overlaid image based on the overlay image and the real image received from moderator device 130 such that the overlaid image is displayed, thereby reducing latency of collaborative platform 100.

To initiate the process set forth in FIG. 5A, at step 500, an original image is received by receiver 120. For example, the original image may be received from moderator device 130 and may include, e.g., a blank screen, a math problem, a picture, etc. At step 501, receiver 120 sets the original image received from moderator device 130 as a current image. This may involve decoding an original image and/or placing an original image in a buffer. At step 502, user input data indicative of user input may be received by receiver 120, e.g., via a USB cable and/or a wireless connection such as Bluetooth, from display 105. Preferably, the user type of the user input may be set to preprogrammed default settings, e.g., default color (gray), default thickness (normal), and default marker user type, until optionally changed by the user as described with regards to steps 504 to 506. If receiver 120 receives user input data from display 105 at step 502, the process may proceed to step 503. If receiver 120 does not receive user input data from display 105 at step 502, the process may proceed directly to step 508 described in further detail below.

At step 503, receiver 120, running the collaboration application, transmits the user input data to the source of the original image, e.g., moderator device 130, for further processing and analysis. As described above, moderator device 130 generates real image(s) based on the user input data received from receiver 120. In addition, receiver 120 running the overlay image generation application generates an overlay image based on the user input data for immediate display.

Optionally, at step 504, receiver 120 analyzes the user input data received from display 105 at step 502 to determine if the at least one user type changed. For example, receiver 120 may compare the user input's spatial location on display 105 as well as the physical contact with display 105 at various points of time to determine using, e.g., machine learning, artificial intelligence, or neural network, if the user has selected a different user type. If receiver 120 determines that a different user type has not been selected, e.g., the user is not click on a different user type icon, at step 505, receiver 120 will continue using the previous user type, e.g., the color gray. If receiver 120 determines that a different user type has been selected, e.g., the user selected the color red, based on the spatial location of the user input and the fact that the user discontinued contact with display 105 and re-contacted display 105 at that specific spatial location on display 105, at step 506, receiver 120 selects the new user type, e.g., the color red.

Figure 5B:
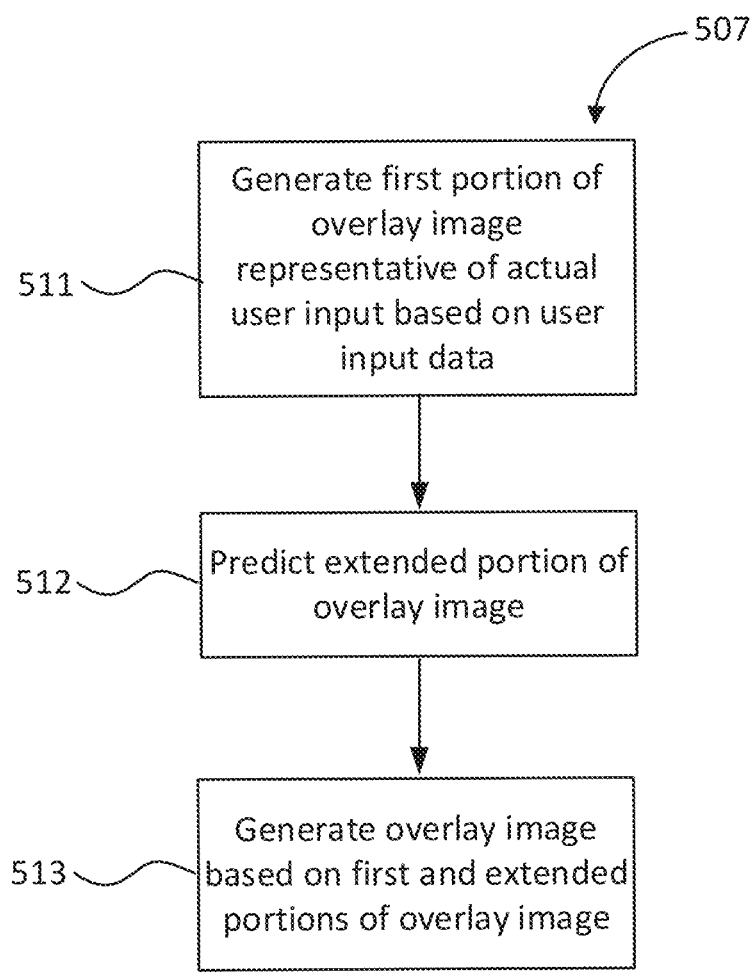
FIG. 5B is a flow chart illustrating the steps of overlaid image generation of FIG. 5A.

At step 507, receiver 120 generates a leading end of an overlay image based on the user input data received at step 502 as described in further detail with regard to FIG. 5B, as well as the user type selected at step 505 or 506 if a user type is selected at step 505 or 506. Preferably, the overlay image may be generated based on the user input data and a default user type, e.g., a default color and/or default line thickness, and thus step 507 may be initiated after step 503 without steps 504 to 506. The overlay image generated will be representative of the user's actual input provided by the user, and further may include predicted user input based on the user's actual input.

For example, as shown in FIG. 5B, to generate an overlay image based on the user input data and optionally the user type, at step 511, receiver 120 generates a first portion of the overall overlay image which is representative of the user's actual input received by receiver 120, e.g., via a USB cable and/or a wireless connection such as Bluetooth, from display 105. Accordingly, the first portion of the overlay image, when displayed on display 105 as an overlaid image, will illustrate what the user actually inputted on display 105. At step 512, receiver 120 generates a second, extended portion of the overall overlay image, which may be a prediction of the user's intended input based on the user input data received by receiver 120, e.g., via a USB cable and/or a wireless connection such as Bluetooth, from display 105. For example, using, e.g., extrapolation, machine learning, artificial intelligence, and/or neural network, receiver 120 may analyze the spatial coordinates and/or the time coordinates of the user's input from the user input data to predict the user's intended input, e.g., what the user's next input will be, as described in further detail below. At step 513, receiver 120 generates an overlay image based on the first and second, extended portions of the overlay image, such that the overlay image will include what the user actually inputted on display 105 and what the user is predicted to input on display 105.

Referring again to FIG. 5A, at step 508, receiver 120 may remove a portion of the trailing end of the overlay image as receiver 120 generates the leading end of an overlay image. For example, the portion of the overlay image of the overlaid image displayed on display 105 may be removed as a function of time, or as a function of the spatial amount of overlay image of the overlaid image displayed on display 105 at a given time. For example, each spatial coordinate of the overlay image of the overlaid image displayed on display 105 may remain displayed for a predetermined amount of time, e.g., 100 to 300 milliseconds or more. Accordingly, each spatial coordinate that makes up the overlay image of the overlaid image on display 105 may remain on display 105 for the same amount of time, and may be removed after that time has lapsed. Each spatial coordinate of the overlay image is initially displayed on display 105 at the leading end of the overlay image of the overlaid image, and as time lapses and additional spatial coordinates are displayed, the initial leading spatial coordinate ends up being at the trailing end of the overlay image of the overlaid image before it is removed, e.g., after the predetermined amount of time has lapsed. For example, the predetermined amount of time that each spatial coordinate is displayed may be at least as long as the latency period of the real image to be received by and appear on display 105. Accordingly, for a given amount of spatial coordinates displayed on display 105 within a predetermined time period, e.g., the same amount of spatial coordinates will be removed within the same predetermined time period from display 105.

In accordance with another aspect of the present invention, the portion of the overlay image of the overlaid image displayed on display 105 may have a maximum spatial distribution, e.g., length between the leading end and the trailing end of the overlay image of the overlaid image and/or amount of spatial coordinates, for a given amount of time. Thus, after a spatial coordinate of the overlay image of the overlaid image is initially displayed on display 105, after a predetermined amount of additional spatial coordinates are displayed such that the initial spatial coordinate is now at the trailing end of the overlay image of the overlaid image, the initial spatial coordinate of the overlay image of the overlaid image will be removed from display 105 when the amount of additional spatial coordinates displayed on display 105 exceeds the predetermined maximum amount of spatial coordinates permitted on display 105.

Accordingly, if receiver 120 does not receive user input data from display 105 at step 502, at step 508, no additional leading end will be added to the overlay image, e.g., when the user removes their stylet/finger from display 105 such that no additional user input is provided to display 105, while a portion of the trailing end of the overlay image will gradually be removed from the trailing end of the overlay image and replaced with the current real images received from moderator device 130 until, e.g., the overlay image of the overlaid image displayed on display 105 is completely replaced by the current image or additional user input is received by receiver 120 from display 105 at step 502.

At step 509, receiver 120 generates an overlaid image based on the overlay image generated at step 507 and the current image set at step 501. Thus, the overlaid image generated will be representative of the user's actual input provided by the user, and further may include predicted user input based on the user's actual input, superimposed on the current image. For example, the overlay image may be superimposed on the real image to form the overlaid image, as described with regard to FIG. 5C below, which may then be sent by receiver 120 to display 105. Accordingly, no latency of collaborative platform 100 is perceived on display 105 as the predicted portion of the overlaid image is displayed seemingly analogously with the user's input. Moreover, the current image may be periodically updated as receiver 120 receives additional images (e.g., real images) from moderator device 130. For example, a received additional image may be decoded and/or added to a buffer and may become the current image. In this manner, the overlaid image generated by receiver 120 may be superimposed on the updated current image.

Figure 5C:
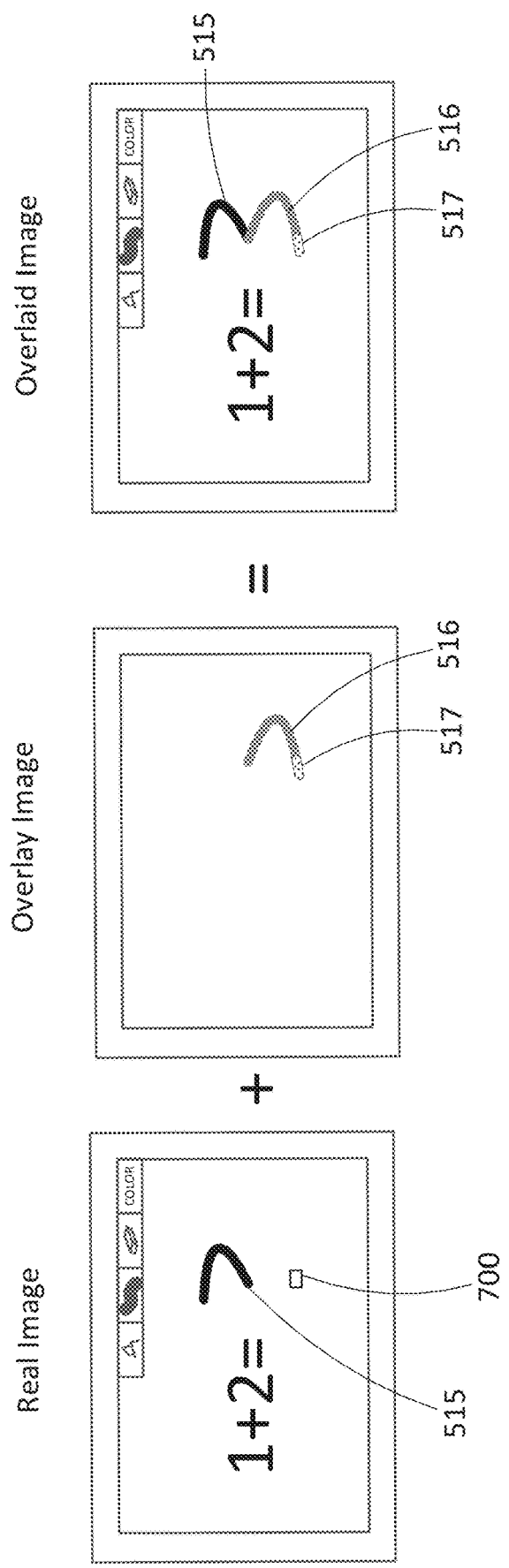
FIG. 5C illustrates overlaid image generation in accordance with the principles of the present invention.

As shown in FIG. 5C, the overlay image may be superimposed on the real image to form the overlaid image. For example, the real image may include line 515, generated by moderator device 130 based on user input data corresponding to user input received by receiver 120 from display 105. Line 515 represents what the user actually draws on display 105, but only includes that much which has been generated by moderator device 130 based on the user input data. For example, the user's actual input in real-time may be at another point on display 105 as denoted by stylet 700. As described above, the overlay image generated by receiver 120 includes first portion 516, which is representative of the user's actual input received by receiver 120, and second, extended portion 517, which may be a prediction of the user's intended input based on the user input data received by receiver 120. Moreover, the overlay image, e.g., lines 516 and 517, may be superimposed on the real image, e.g., line 515, to form the overlaid image, e.g., lines 515, 516, and 517. As described in further detail below, portions of the overlay image may be removed as a function of, e.g., time, and thus, as the real image grows, e.g., the "3" is being drawn, line 515 gets longer, while lines 516 and 517 of the overlay image may be displayed only toward the growing leading end of line 515 of the overlaid image, as shown in FIG. 5C. Moreover, as the overlay image may further be generated based on the speed of the user input, the overlay image, e.g., lines 516 and 517, may be displayed as longer lines when the user input is received faster by display 105, and as shorter lines when the user input is received slower by display 105.

Referring again to FIG. 5A, at step 510, receiver 120 transmits the overlaid image, e.g., the first and second, extended portions of the overlaid image superimposed on the current image, to display 105, thereby reducing and/or eliminating latency of collaborative platform 100. Moreover, an additional real image corresponding to additional user input data from display 105 may be received by receiver 120 from moderator device 130 and be set as additional current image, and an additional overlaid image may be generated by receiver 120 based on the overlay image created by these additional user input data and superimposed on the additional current image.

Figure 6A:
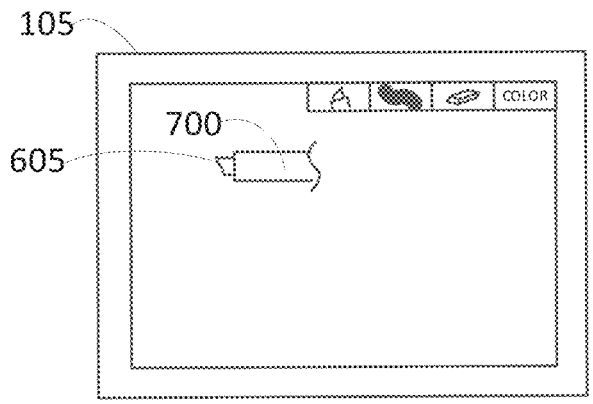
FIGS. 6A-6E illustrate the steps of reducing latency on a collaborative platform in accordance with the principles of the present invention.
Figure 6B:
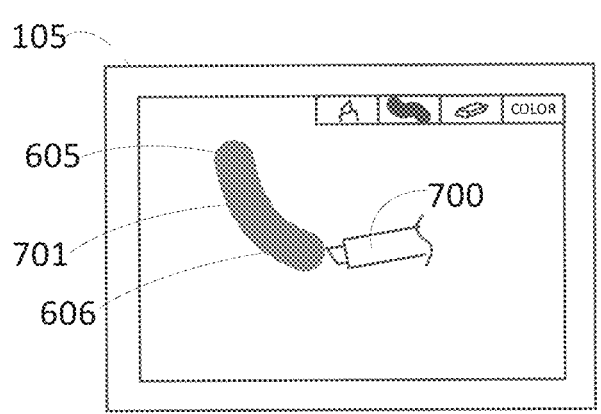

Referring now to FIGS. 6A-6E, the user input provided by the user is illustrated in conjunction with the display of the overlaid image generated by receiver 120 to illustrate the latency of the real image. As shown in FIG. 6A, the original image displayed on display 105, e.g., a touchscreen, may be blank, and the user may use stylet 700 to interact with display 105 by pressing stylet 700 against display 105 at point 605. As shown in FIG. 6B, the user drags stylet 700 from point 605 to point 606 on display 105. The dragging motion of stylet 700 by the user, i.e., the user input, is converted to user input data by display 105 and transmitted to receiver 120, which then transmits the user input data to moderator device 130 to modify the original image and generate a real image based on the user input data as described above. An overlaid image is then generated by receiver 120 based on the user input data (and optionally the user type) and the real image received from moderator device 130, and transmitted to display 105 and displayed. As described above, the overlaid image may be formed by an overlay image superimposed on the real image, whereas the overlay image includes a first portion representative of the user's actual input received by display 105, and a second, extended portion, which may be a prediction of the user's intended input based on the user input data received by display 105. As shown in FIG. 6B, the real image is still the blank original image, and thus, the overlaid image appears to only include overlay image 701 of the overlaid image. Accordingly, latency is reduced on collaborative platform 100 as the overlaid image is displayed almost immediately after the user drags stylet 700 from point 605 to 606, and thus, is hardly noticeable by the user or other observers looking at display 105.

Figure 6C:
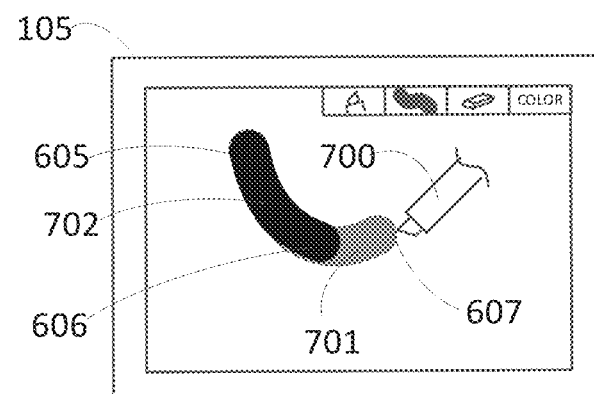

The latency of the collaboration application of collaboration platform 100 is illustrated in FIG. 6C. As shown in FIG. 6C, the user continues to drag stylet 700 from point 606 to point 607. Meanwhile, the user input is continuously converted to user input data by display 105 and transmitted to receiver 120, which is then continuously transmitted to moderator device 130 via a wireless connection, e.g., WiFi, for processing. As described above, moderator device 130 modifies the original image stored in memory thereof based on the user input data, and generates a real image representing the user input, e.g., the dragging motion of stylet 700 by the user on display 105. As shown in FIG. 6C, when stylet 700 is at point 607, moderator device 130 has only processed the user input data representing the user's dragging motion of stylet 700 from point 605 to point 606, and accordingly generates a real image, e.g., real image 702, representing the user's input. The real image generated by moderator device 130 is then transmitted to receiver 120. As described above, receiver 120 generates an overlaid image, which includes overlay image 701, e.g., the first portion representative of the user's actual input received by display 105, and the predicted second, extended portion representative of the user's intended input, superimposed on real image 702. The overlaid image is then transmitted to display 105 via a wired connection, e.g., an HDMI cable, to be displayed.

As the data flow of the collaboration application requires the user input data to be transmitted via a wired connection from display 105 to receiver 120 and via a wireless connection from receiver 120 to moderator device 130, and the real image via a wireless connection from moderator device 130 to receiver 120 and ultimately via a wired connection from receiver 120 to display 105, undesirable latency of collaboration platform 100 is observed. This is illustrated in FIG. 6C as real image 702 being displayed with a delay behind overlay image 701. As an illustrative example in FIG. 6C, when stylet 700 is at point 607, overlay image 701 appears as a mark from point 605 to immediately adjacent 607, while real image 702 has only reached point 606.

Figure 6D:
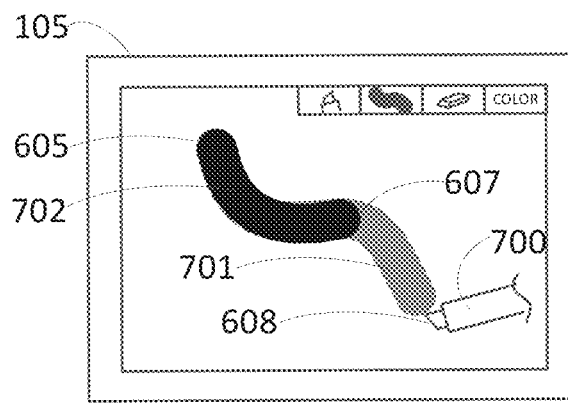
Figure 6E:
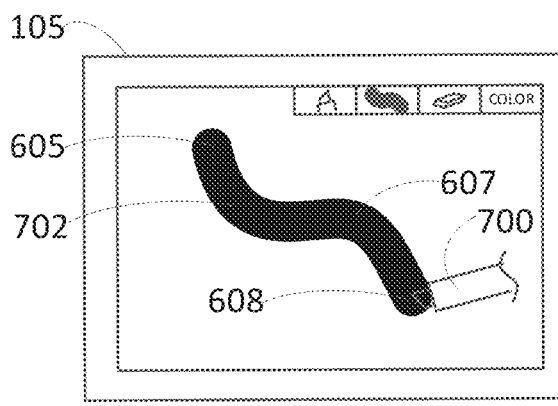

Moreover, as shown in FIG. 6D, when stylet 700 is at point 608, overlay image 701 appears as a mark from point 605 to immediately adjacent 608, while real image 702 has only reached point 607. FIG. 6E illustrates display 105 after some time after the latency of collaborative platform 100 such that overlay image 701 and real image 702 extend from point 605 to point 608.

In addition, receiver 120 may derive and/or receive information indicative of one or more user types, such that the overlay image generated is also based on the one or more user types. For example, the user may select one or more user types, e.g., thickness, color, or marker or eraser type, and provide user input in accordance with the selected user type. Accordingly, as the user begins to draw, e.g., a number "3" in the color red on display 105, an overlay image will be generated by receiver 120 and transmitted to display 105 as an overlaid image such that an overlaid image of the number "3" in the color red will begin to be displayed on display 105 with reduced latency.

Figure 7A:
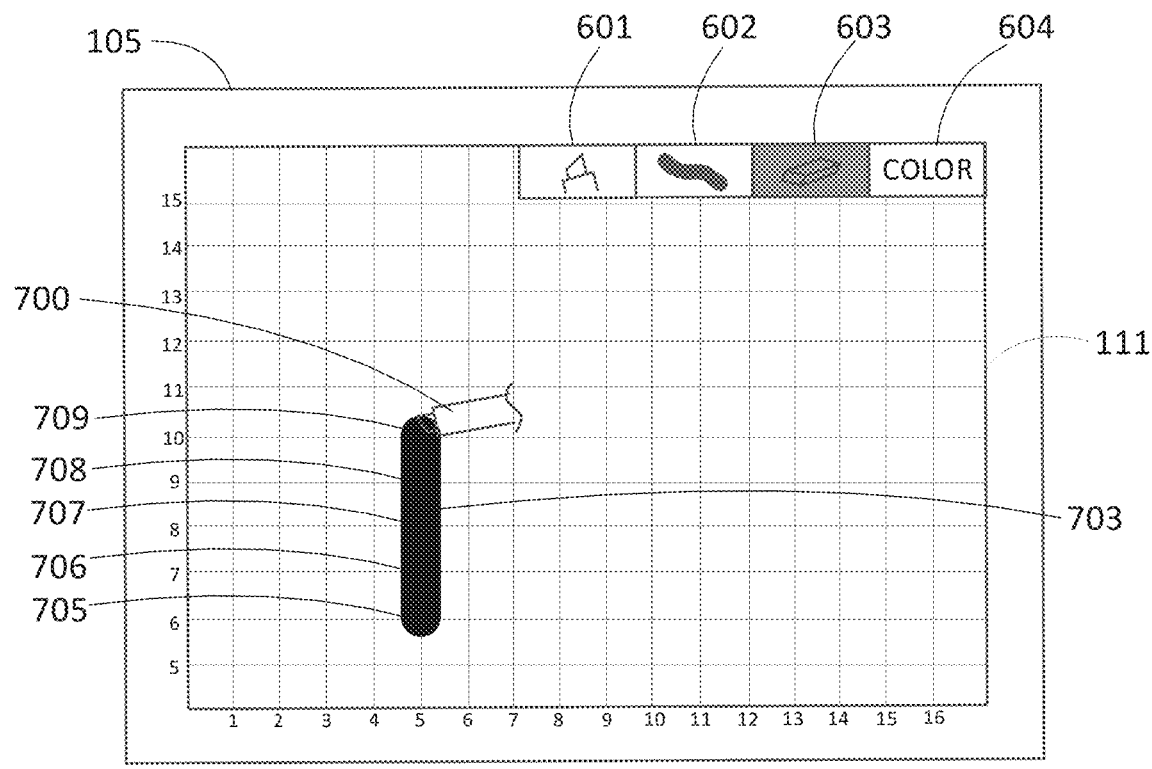
FIGS. 7A-7D illustrate overlay image prediction generation in accordance with the principles of the present invention.
Figure 7B:
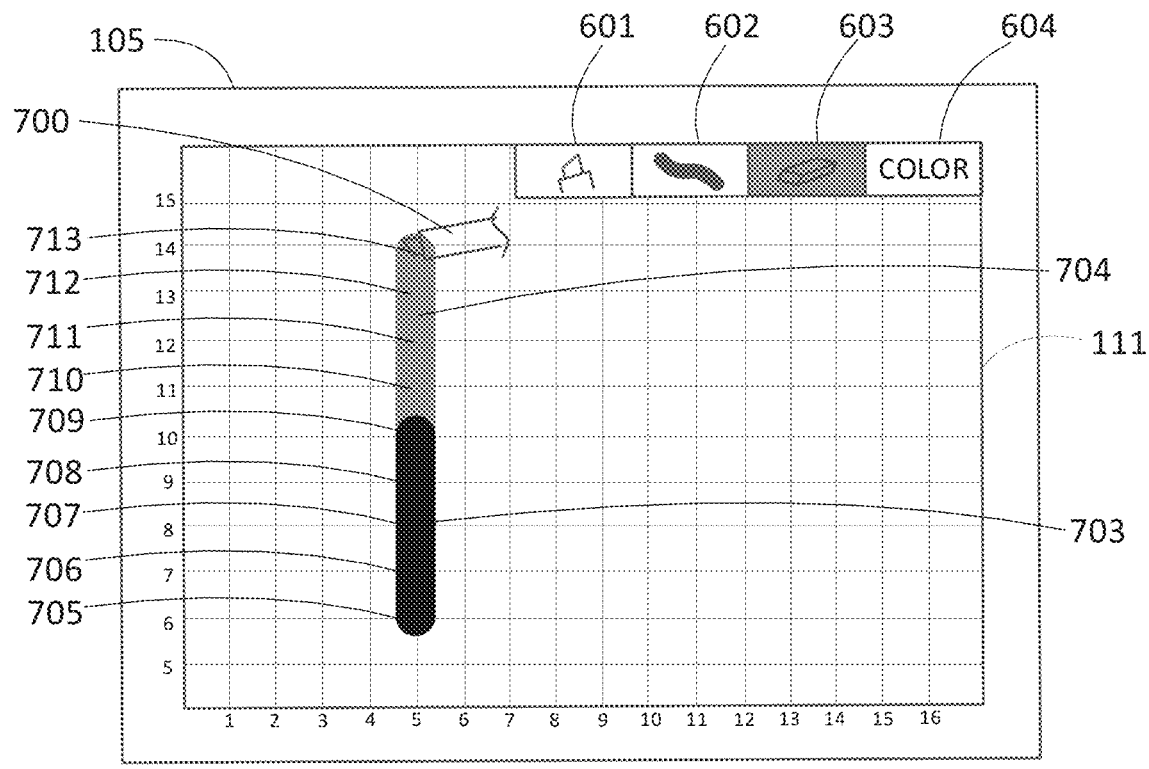

Referring now to FIGS. 7A-7D, the user input provided by the user is illustrated in conjunction with the display of the overlaid image generated by receiver 120, such that the overlaid image includes the user's actual input in addition to the predicted user input generated by receiver 120, superimposed on the real image. As shown in FIG. 7A, the user may use stylet 700 to interact with display 105 by pressing stylet 700 against display 105 at point 705 (5,6), and dragging stylet 700 from point 705 (5,6) to point 706 (5,7) to point 707 (5,8) to point 708 (5,9) to point 709 (5,10) on display 105. Accordingly, the user's actual input is depicted as line 703 as shown in FIG. 7A. The dragging motion of stylet 700 by the user, i.e., the user input, is converted to user input data by display 105 and transmitted to receiver 120 as described above. Thus, the user input data includes the user's actual input, e.g., spatial coordinates (5,6), (5,7), (5,8), (5,9), and (5,10). An overlay image is then generated by receiver 120 based on the user input data (and optionally the user type), and transmitted to display 105 to be displayed as an overlaid image. As described above, the overlay image includes the user's actual input, e.g., line 703, as well as the predicted user input, e.g., line 704, generated by receiver 120, as shown in FIG. 7B. For example, line 704 may be predicted by receiver 120 based on spatial coordinates (5,6), (5,7), (5,8), (5,9), and (5,10) of the user input data using extrapolation, e.g., linear extrapolation, polynomial extrapolation, conic extrapolation, French curve extrapolation and/or any other well-known extrapolation techniques, machine learning, artificial intelligence, or a neural network. Based on spatial coordinates (5,6), (5,7), (5,8), (5,9), and (5,10), receiver 120 predicts that the user's next input will be to continue dragging stylet 700 from point 709 (5,10) to point 710 (5,11) to point 711 (5,12) to point 712 (5,13) to point 713 (5,14).

In addition, line 704 may be predicted by receiver 120 based on the time coordinates of the user input data using extrapolation, machine learning, artificial intelligence, or a neural network. For example, the user input data received by receiver 120 may include data indicating that point 705 was touched by stylet 700 at T1, point 706 at T2, point 707 at T3, point 708 at T4, and point 709 at T5, and receiver 120 may determine the velocity of stylet 700 based on T1-T5. Thus, receiver 120 will predict that point 710 will be touched by stylet 700 at T6, point 711 at T7, point 712 at T8, and point 713 at T9, such that the velocity between T6-T9 corresponds with the velocity of T1-T5. Accordingly, points 710-713 of line 704 will be displayed on display 105 with a velocity corresponding to the velocity based on T1-T5, such that points 710, 711, 712, and 713 of line 704 will appear on display 105 at the same time the user drags stylet 700 to point 710, 711, 712, and 713 in real time, thereby eliminating any latency on collaborative platform 100. In addition, receiver 120 may determine the acceleration of stylet 700 based on T1-T5, such that the acceleration between T6-T9 corresponds with the acceleration of T1-T5. Accordingly, points 710-713 of line 704 will be displayed on display 105 with a modified velocity corresponding to the acceleration based on T1-T5, such that points 710, 711, 712, and 713 of line 704 will appear on display 105 at the same time the user drags stylet 700 to point 710, 711, 712, and 713 in real time, thereby eliminating any latency on collaborative platform 100.

Using extrapolation, machine learning, artificial intelligence, or a neural network, receiver 120 may predict complex curved lines by predicting finite line segments forming the curve as well as predicting the angle of each finite line segment and the change of angle between adjacent line segments. For example, receiver 120 may detect a first angle of a first line segment of the user's actual input, and detect a second angle of a second line segment of the user's actual input, and determine the change of angle between the first angle and the second angle. Based on the first angle, second angle, and change of angle of the user's actual input, receiver 120 may predict the curve of the user's next input of finite line segments. For example, if receiver 120 detects that the user's actual input is a sequence of finite line segments that form a curve with known changes of angles between each adjacent line segment, receiver 120 will generate an overlay image having a predicted extended portion with the same curvature. Moreover, receiver 120 may detect a rate of change of the change of angle between adjacent finite line segments of the user's actual input and predict the user's next input based on the detected rate of change of the change of angle between adjacent finite line segments.

Figure 7C:
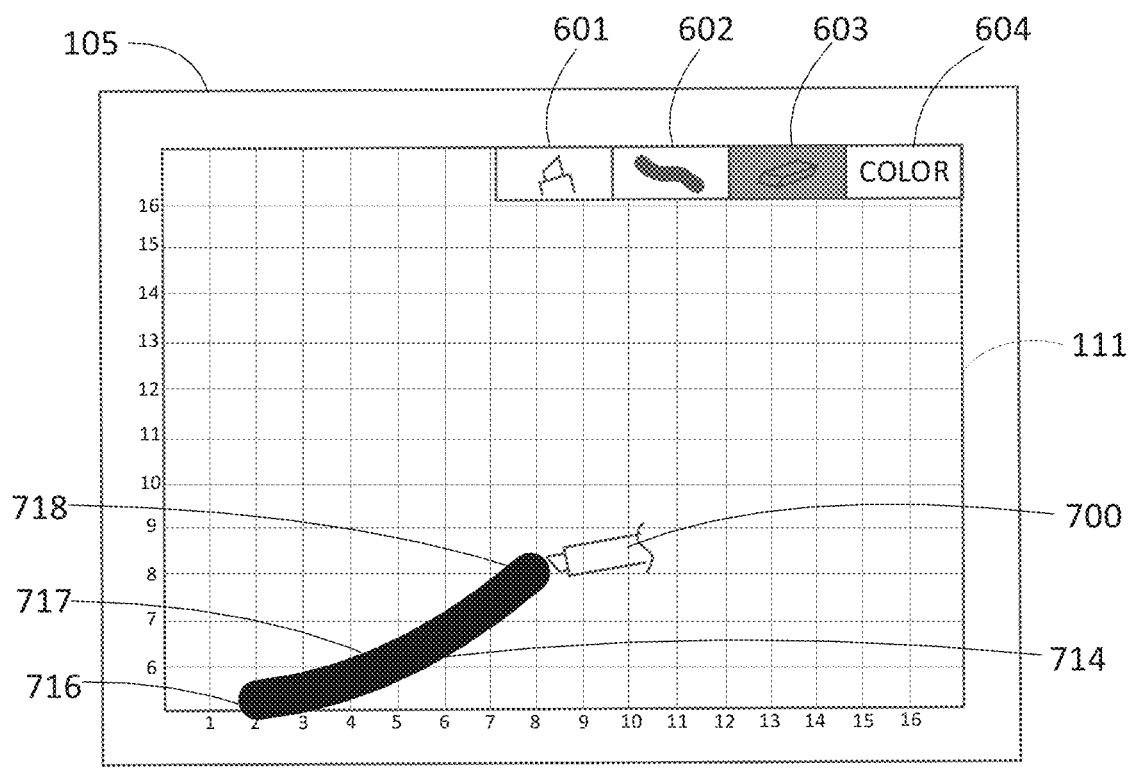
Figure 7D:
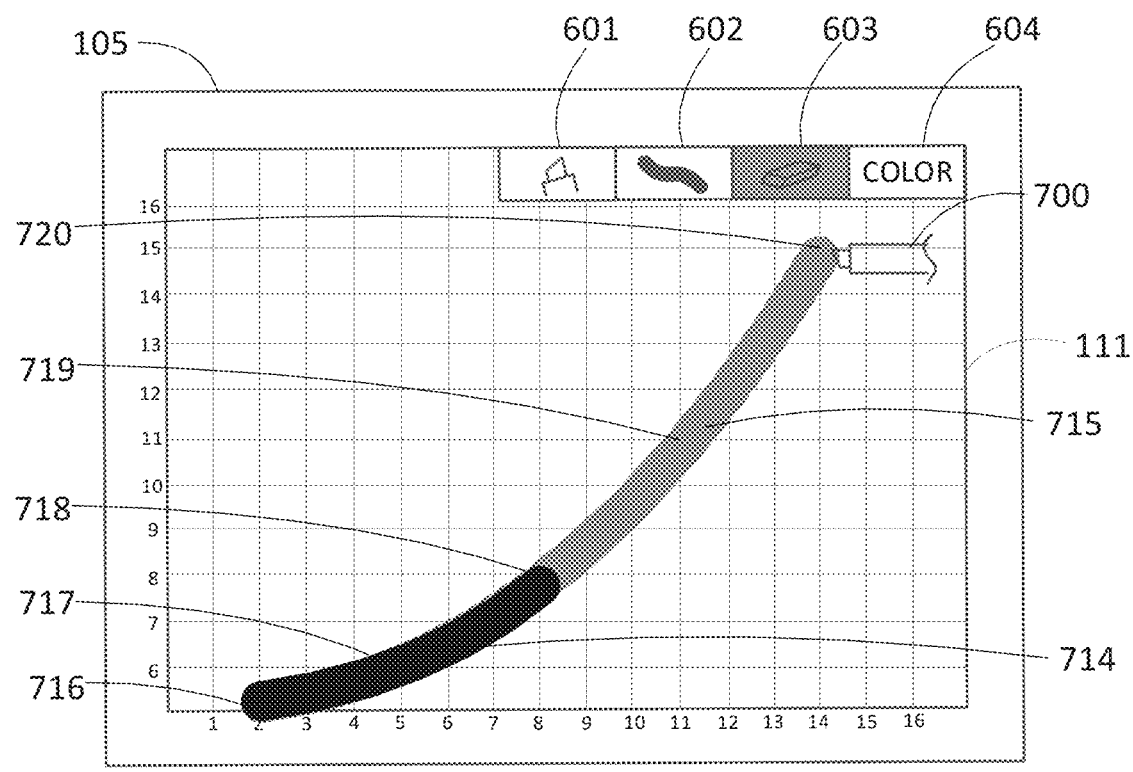

As shown in FIG. 7C, the user may use stylet 700 to interact with display 105 by pressing stylet 700 against display 105 at point 716 (2,5), and dragging stylet 700 from point 716 (2,5) to point 717 (5,6) to point 718 (8,8) on display 105. Accordingly, the user's actual input is depicted as line 714 as shown in FIG. 7C. The dragging motion of stylet 700 by the user, i.e., the user input, is converted to user input data by display 105 and transmitted to receiver 120 as described above. Thus, the user input data includes the user's actual input, e.g., a first line segment from spatial coordinate (2,5) to spatial coordinate (5,6) having a first angle, and a second line segment from spatial coordinate (5,6) to spatial coordinate (8,8). An overlay image is then generated by receiver 120 based on the user input data (and optionally the user type), and transmitted to display 105 to be displayed as an overlaid image. As described above, the overlay image includes the user's actual input, e.g., line 714, as well as the predicted user input, e.g., line 715, generated by receiver 120, as shown in FIG. 7D. For example, line 715 may be predicted by receiver 120 based on spatial coordinates (2,5), (5,6), and (8,8) of the user input data using extrapolation, machine learning, artificial intelligence, or a neural network. Based on the first angle of the first line segment from spatial coordinate (2,5) to spatial coordinate (5,6), and the second angle of the second line segment from spatial coordinate (5,6) to spatial coordinate (8,8), receiver 120 predicts that the user's next input will be to continue dragging stylet 700 from point 718 (8,8) to point 719 (11,11) to point 720 (14,15). The angle of the line segment from point 718 to point 719 and from point 719 to point 720 will correspond with the rate of change between the first angle of the line segment from point 716 to point 717 and the second angle of the line segment from point 717 to point 718.

As described above, line 715 may also be predicted by receiver 120 based on the time coordinates of the user input data using extrapolation, machine learning, artificial intelligence, or a neural network. For example, the user input data received by receiver 120 may include data indicating that point 716 was touched by stylet 700 at T1, point 717 at T2, and point 718 at T3, and receiver 120 may determine the velocity of stylet 700 based on the T1-T3. Thus, receiver 120 will predict that point 719 will be touched by stylet 700 at T4, and point 720 at T5, such that the velocity between T3-T5 corresponds with the velocity of T1-T3. Accordingly, points 719 and 720 of line 715 will be displayed on display 105 with a velocity corresponding to the velocity based on T1-T3, such that points 719 and 720 of line 715 will appear on display 105 at the same time the user drags stylet 700 to point 719, and 720 in real time, thereby eliminating any latency on collaborative platform 100. In addition, receiver 120 may determine the acceleration of stylet 700 based on T1-T3, such that the acceleration between T3-T5 corresponds with the acceleration of T1-T3. Accordingly, points 719 and 720 of line 715 will be displayed on display 105 with a modified velocity corresponding to the acceleration based on T1-T3, such that points 719 and 720 of line 715 will appear on display 105 at the same time the user drags stylet 700 to point 719 and 720 in real time, thereby eliminating any latency on collaborative platform 100.

Figure 8A:
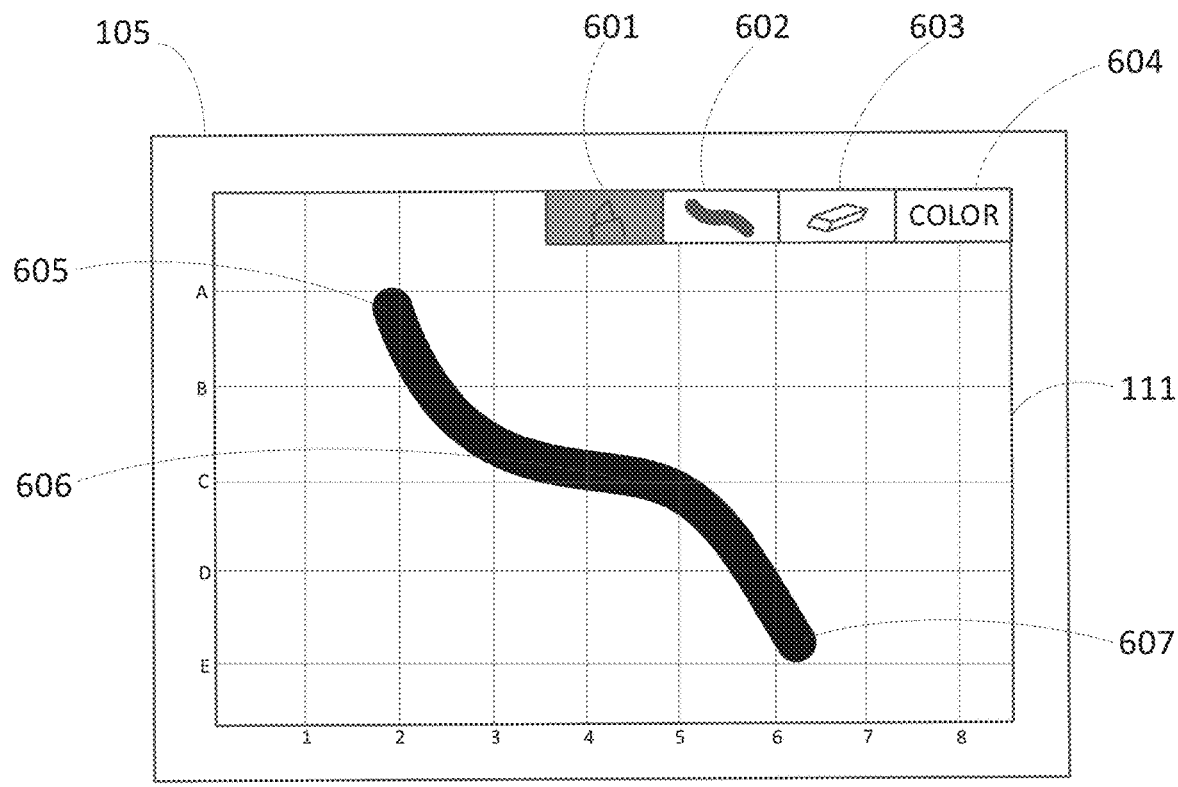
FIGS. 8A and 8B illustrate user type data collection in accordance with one aspect of the present invention.
Figure 8B:
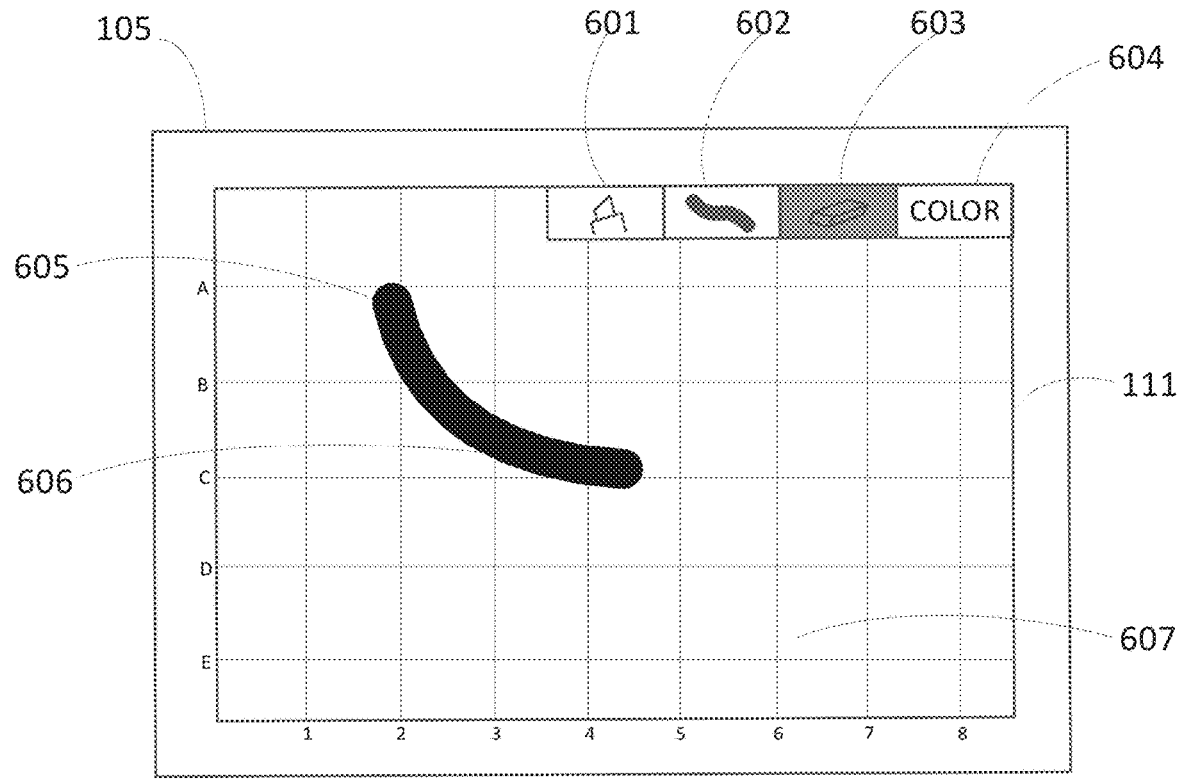

Referring now to FIGS. 8A and 8B, an exemplary method of collecting user type data in accordance with one aspect of the present invention is provided. FIG. 8A is a screenshot of display 105 at a first time, and FIG. 8B is a screenshot of display 105 at a second time. As shown in FIGS. 8A and 8B, the interface displayed on display 105 may include user-friendly icons in a ribbon at the top of the screen representing selectable user types including, but not limited to, marker icon 601, thickness icon 602, eraser icon 603, and color icon 604. Upon clicking, for example, thickness icon 602, a drop down menu may appear with additional sub-icons for selecting between thickness levels such as "thin," "normal," and "thick." Further, upon clicking, for example, color icon 604, a drop down menu may appear with additional sub-icons for selecting between different colors such as "gray," "black," "blue," "yellow," etc. Preferably, the user type of the user input may be set to preprogrammed default settings, e.g., default color (gray), default thickness (normal), and default marker user type, until subsequently changed by the user.

As described above, receiver 120 may receive user input data from display 105 via a wired connection, e.g., a USB cable, and/or a wireless connection such as Bluetooth, and from the user input data, determine one or more user types of the user input. For example, using, e.g., machine learning, artificial intelligence, and/or neural network, receiver 120 may analyze and/or process user input data to determine the user type. Using machine learning, artificial intelligence, and/or neural networks receiver 120 may determine user type based on patterns of the user's movement with regard to display 105, and/or observing the user's actions, e.g., what types of marks are drawn, that follow.

Referring to FIG. 8A, the user drew a line extending from point 605 to point 606 to point 607 by, e.g., contacting display 105 and moving from point 605 to point 606 to point 607 without discontinuing contact with display 105. As shown in FIG. 8A, marker icon 601 was previously selected, for example, by contacting any point within a perimeter of points on display 105 corresponding to marker icon 601. Based on machine learning, artificial intelligence, or neural network, receiver 120 can identify the interface of display 105 and correlate specific actions by the user (e.g., clicking on the point of display 105 where marker icon 601 resides) with specific user types. For example, when marker icon 601 is observed to be clicked, and the immediately following user input data indicates that following the clicking of marker icon 601, dragging motion of the stylet by the user from point 605 to point 606 to point 607 results in a mark extending from point 605 to point 606 to point 607, receiver 120 will learn that by clicking on the point of display 105 where marker icon 601 resides, the marker user type has been selected, which permits the user to draw lines. Thus, receiver 120 will associate the spatial region of marker icon 601 with the function of drawing solid lines. Using machine learning and comparing a plurality of user inputs taken at various time points, receiver 120 can deduce the various icons of any interface, and their respective functions. Accordingly, receiver 120 may include a database by which it compares actions of the user relative to display 105, given a specific interface, to determine what user type has been selected.

As shown in FIG. 8B, at the second time, receiver 120 receives user input data indicating that the user discontinued contact with display 105, and then contacted display 105 at a point on display 105 associated with eraser icon 603, which has been associated with the function of erasing through machine learning. Accordingly, upon clicking eraser icon 603, receiver 120 determines that the eraser user type has been selected, and generates an overlay image of an eraser mark from point 607 to point 606 in response to the user contacting display 105 at point 607 and dragging the stylet from point 607 to point 606 as shown in FIG. 8B. As will be understood by a person having ordinary skill in the art, by analyzing the user input data received from display 105 to determine which user type is selected, receiver 120 generates the overlay image based on not only user input, but the user type of the user input to accurately display the overlaid image corresponding to the user's selected user type and user input.

Figure 9A:
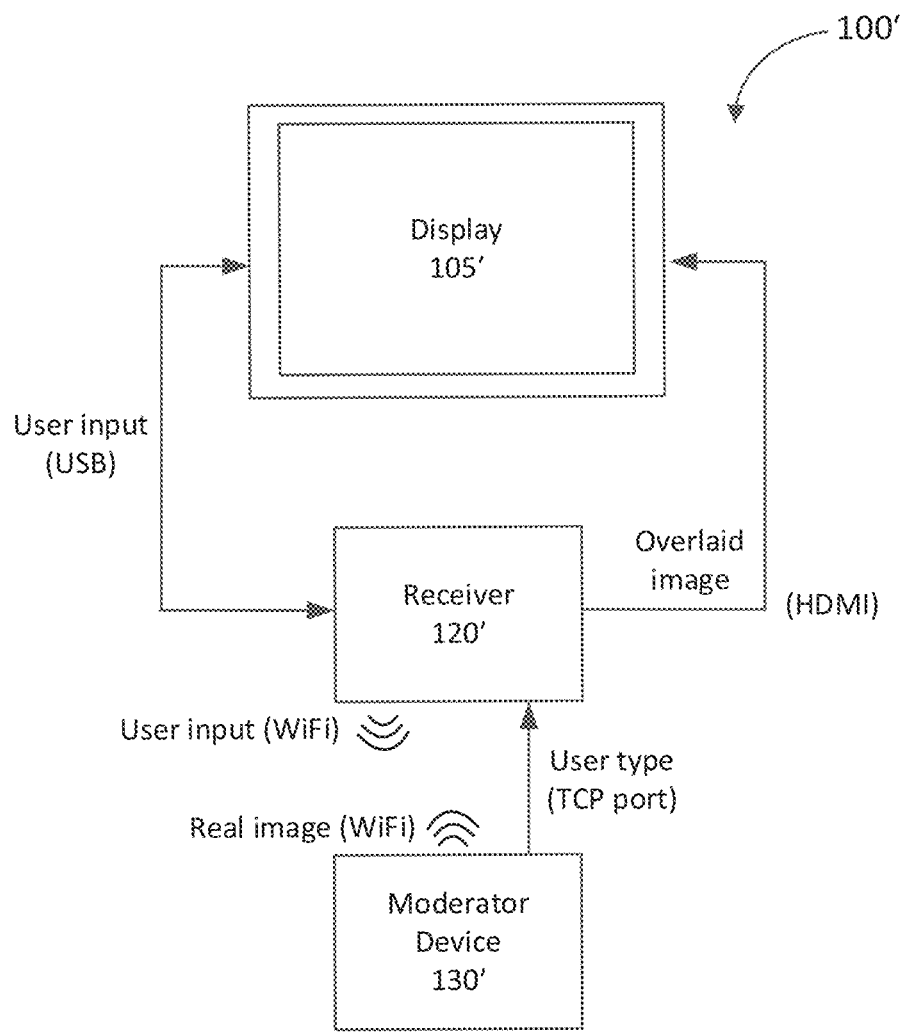
FIG. 9A is a block diagram of an alternative embodiment of the collaborative platform in accordance with another aspect of the present invention.

Referring now to FIG. 9A, a block diagram of another exemplary embodiment of collaborative platform 100' in accordance with the principles of the present invention is provided. As shown in FIG. 9A, user input data may be transmitted from display 105' to receiver 120' via a wired connection, e.g., a USB cable, and/or a wireless connection such as Bluetooth. In addition, user input data and the real image may be communicated between receiver 120' and moderator device 130' across a wireless connection, e.g., WiFi. Further, the overlaid image may be transmitted from receiver 120' to display 105' via a wired connection, e.g., an HDMI cable. As shown in FIG. 9A, data indicative of the user type of the user input may be transmitted from moderator device 130' to receiver 120' via a wireless connection, e.g., a defined TCP port.

Figure 9B:
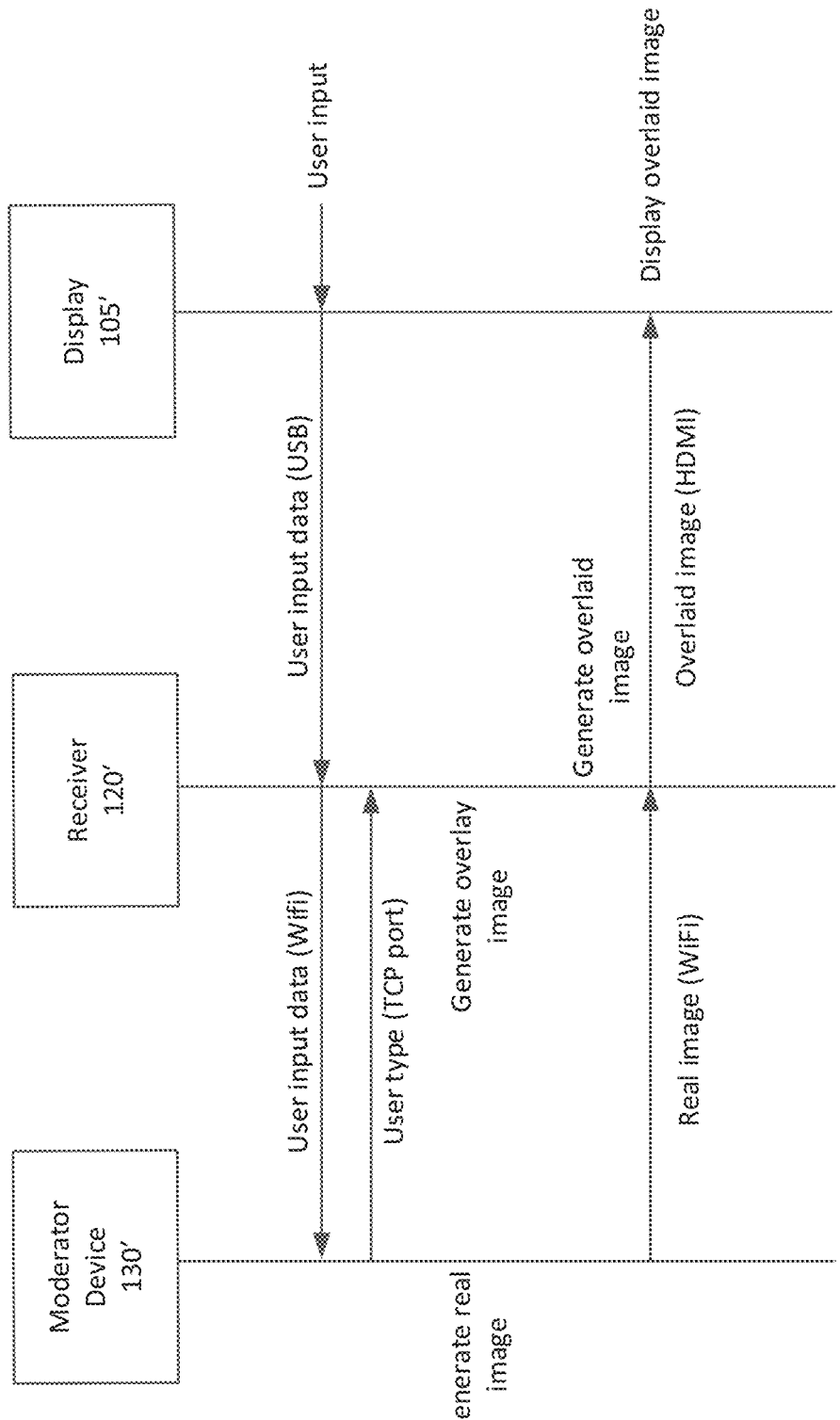
FIG. 9B is a sequence diagram for using the collaborative platform in accordance with the illustrative embodiment depicted in FIG. 9A.

Referring now to FIG. 9B, a sequence diagram for using collaborative platform 100' depicted in FIG. 9A is provided. As described above with reference to FIG. 4B, collaboration platform 100' of FIG. 9A also runs a collaboration application for displaying a first image based on an original image file stored on moderator device 130', receiving user input, modifying the original image file stored on moderator device 130' based on the user input, and displaying a second image based on the modified original image file.

Like collaboration platform 100 of FIG. 4A, collaboration platform 100' may run an overlay image generator application for generating an overlay image by receiver 120' based on the user input provided by the user, generating an overlaid image based on the overlay image, and displaying the overlaid image on the original image on display 105' to reduce latency of collaboration platform 100'. Collaboration platform 100' differs from collaboration platform 100 in that, receiver 120' may receive data indicative of user type directly from moderator device 130' via a wireless connection, e.g., a defined TCP port, in addition to user input data received from display 105' via a wired connection, e.g., a USB cable, and/or a wireless connection such as Bluetooth. In this embodiment, receiver 120' does not need to derive information regarding the selected user type of the user input from user input data received from display 105. For example, as described above with regard to FIG. 3C, moderator device 130' may include overlay image application 139 for processing and analyzing the user input data received from display 105' through receiver 120', determining the user type selected from the user input data, and transmitting the data indicative of the selected user type to receiver 120' via the defined TCP port. Accordingly, receiver 120' generates an overlay image based on both the user input data and the user type data, generates an overlaid image based on the overlay image, and transmits the overlaid image via a wired connection, e.g., an HDMI cable, to display 105', thereby reducing latency of collaboration platform 100'.

Figure 10A:
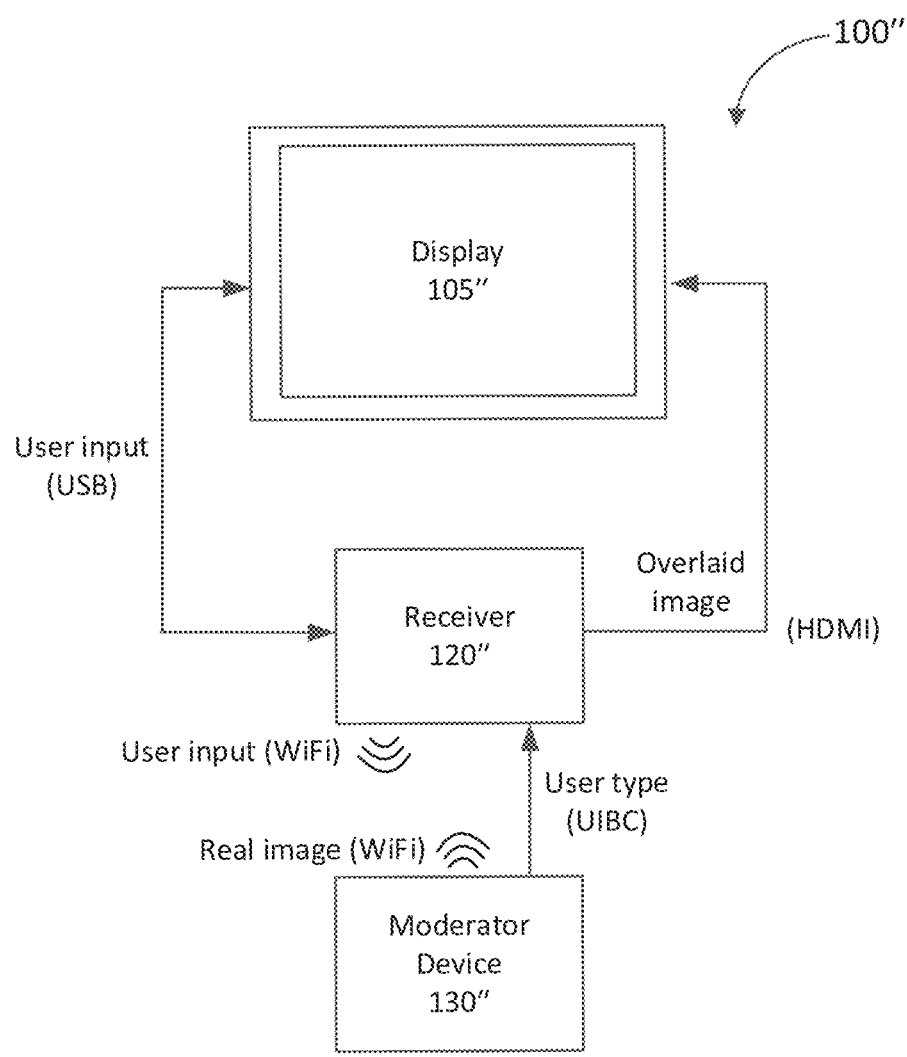
FIG. 10A is a block diagram of another alternative embodiment of the collaborative platform in accordance with yet another aspect of the present invention.

Referring now to FIG. 10A, a block diagram of another exemplary embodiment of collaborative platform 100" in accordance with the principles of the present invention is provided. As shown in FIG. 10A, user input data may be transmitted from display 105" to receiver 120" via a wired connection, e.g., a USB cable, and/or a wireless connection such as Bluetooth. In addition, user input data and real image(s) may be communicated between receiver 120" and moderator device 130" across a wireless connection, e.g., WiFi. Further, the overlaid image may be transmitted from receiver 120" to display 105" via a wired connection, e.g., an HDMI cable. As shown in FIG. 10A, data indicative of the user type of the user input may be transmitted from the operating system of moderator device 130" to receiver 120" via a modified user input back channel (UIBC) extension. A UIBC extension would generally be used to transmit user input data from the receiver to the moderator device; however, here the UIBC extension is modified to permit transmission of data from moderator device 130" to receiver 120".

Figure 10B:
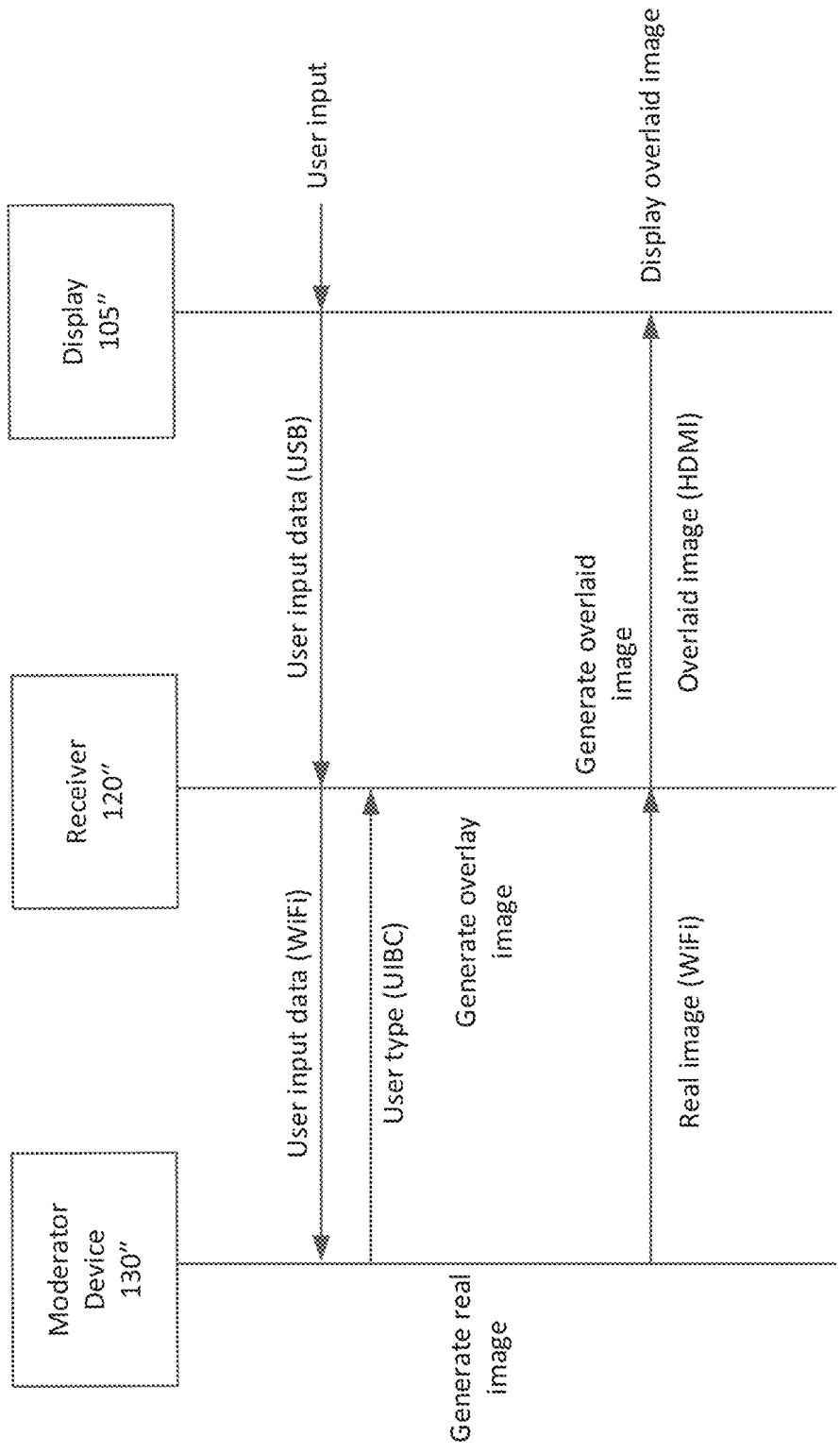
FIG. 10B is a sequence diagram for using the collaborative platform in accordance with the illustrative embodiment depicted in FIG. 10A.

Referring now to FIG. 10B, a sequence diagram for using collaborative platform 100" depicted in FIG. 10A is provided. As described above with reference to FIGS. 4B and 9B, collaboration platform 100" of FIG. 10A also runs a collaboration application for displaying a first image based on an original image file stored on moderator device 130", receiving user input, modifying the original image file stored on moderator device 130" based on the user input, and displaying a second image based on the modified original image file.

Like collaboration platform 100 of FIG. 4A, collaboration platform 100" may run an overlay image generator application for generating an overlay image by receiver 120" based on the user input provided by the user, generating an overlaid image based on the overlay image, and displaying the overlaid image on the original image on display 105" to reduce latency of collaboration platform 100". Collaboration platform 100" differs from collaboration platform 100 in that, receiver 120" may receive data indicative of user type directly from the operating system of moderator device 130" via the UIBC extension described above, in addition to user input data received from display 105' via a wired connection, e.g., a USB cable, and/or a wireless connection such as Bluetooth.

In this embodiment, receiver 120" does not need to derive information regarding the selected user type of the user input from user input data received from display 105. For example, as described above with regard to FIG. 3C, operating system 137 of moderator device 130" may process and analyze the user input data received from display 105" through receiver 120", determine the user type selected from the user input data, and transmit the data indicative of the selected user type to receiver 120" via the UIBC extension. Accordingly, receiver 120" generates an overlay image based on both the user input data and the user type data, generates an overlaid image based on the overlay image, and transmits the overlaid image via a wired connection, e.g., an HDMI cable, to display 105" to be displayed over the original image displayed on display 105", thereby reducing latency of collaboration platform 100".

Figure 11:
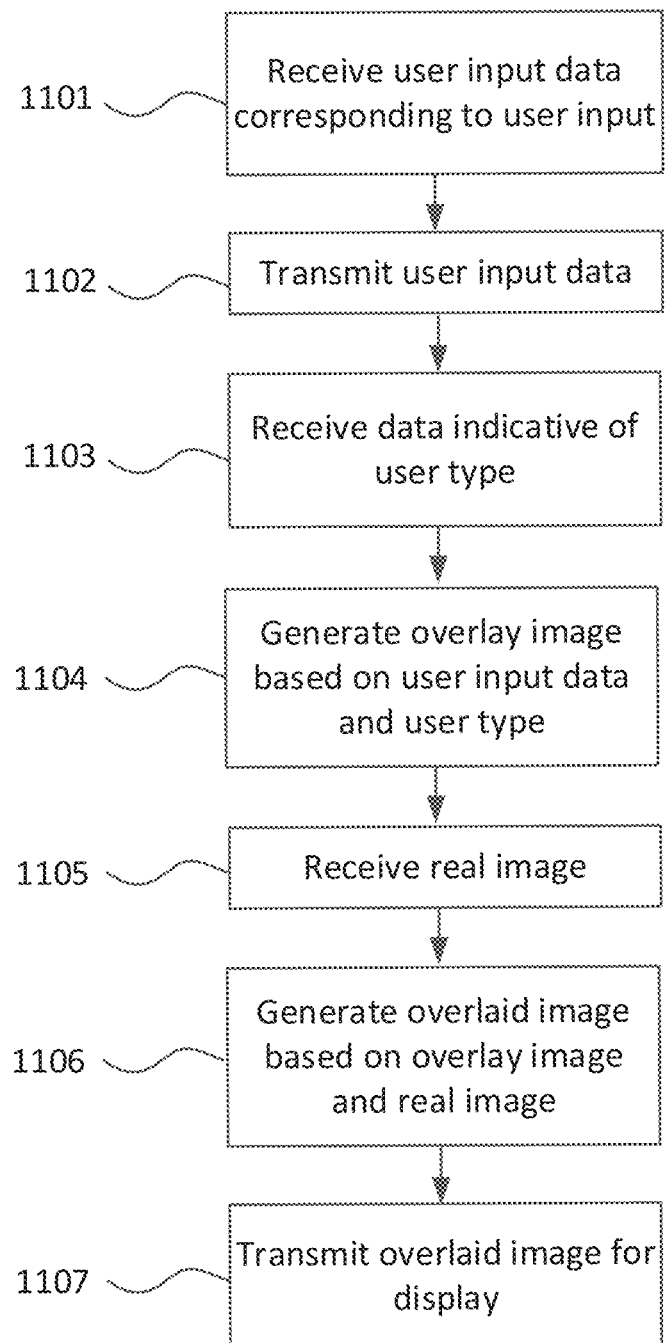
FIG. 11 is a flow chart illustrating alternative exemplary steps of reducing latency on a collaborative platform in accordance with the principles of the present invention.

Referring now to FIG. 11, a flowchart is illustrated detailing the data flow and decisions made in implementing the overlaid image generation functionality of receiver 120' of collaborative platform 100' or receiver 120" of collaborative platform 100". As mentioned above, receiver 120' of collaborative platform 100' and receiver 120" of collaborative platform 100" may be used to generate an overlay image based on user input, and generate an overlaid image based on the overlay image such that the overlaid image is displayed while a real image is being generated by moderator device 130', 130", thereby reducing latency of collaborative platform 100', 100".

To initiate the process set forth in FIG. 11, at step 1101, user input data corresponding to user input is received by receiver 120', 120", e.g., via a USB cable and/or a wireless connection such as Bluetooth from display 105', 105". At step 1102, receiver 120', 120", running the collaboration application, transmits the user input data to the source of the original image, e.g., moderator device 130', 130", for further processing and analysis. For example, moderator device 130', 130" may derive data indicative of at least one user type of the user input. Accordingly, at step 1103, user type data is received by receiver 120', e.g., via a defined TCP port, from an application of moderator device 130', or by receiver 120", e.g., a UIBC extension, from moderator device 130".

At step 1104, receiver 120', 120" generates an overlay image based on the user input data received at step 1101 as well as the user type data received at step 1103. The overlay image may be generated based on the user input data and a default user type until a new user type is received at step 1103. Preferably, the user type of the user input may be set to preprogrammed default settings, e.g., default color (gray), default thickness (normal), and default marker user type, until subsequently changed by the user. At step 1106, receiver 120', 120" receives the real image generated by moderator device 130', 130" based on the user input data received from display 105', 105". At step 1106, receiver 120', 120" generates an overlaid image based on the overlay image and the real image. As described above, the overlaid image may be formed by an overlay image superimposed on the real image, whereas the overlay image includes a first portion representative of the user's actual input received by receiver 120', 120", and a second, extended portion, which may be a prediction of the user's intended input based on the user input data received by receiver 120', 120". At step 1107, receiver 120', 120" transmits the overlaid image to, e.g., display 105', 105", to be displayed on the original image, thereby reducing latency of collaborative platform 100', 100".

Figure 12A:
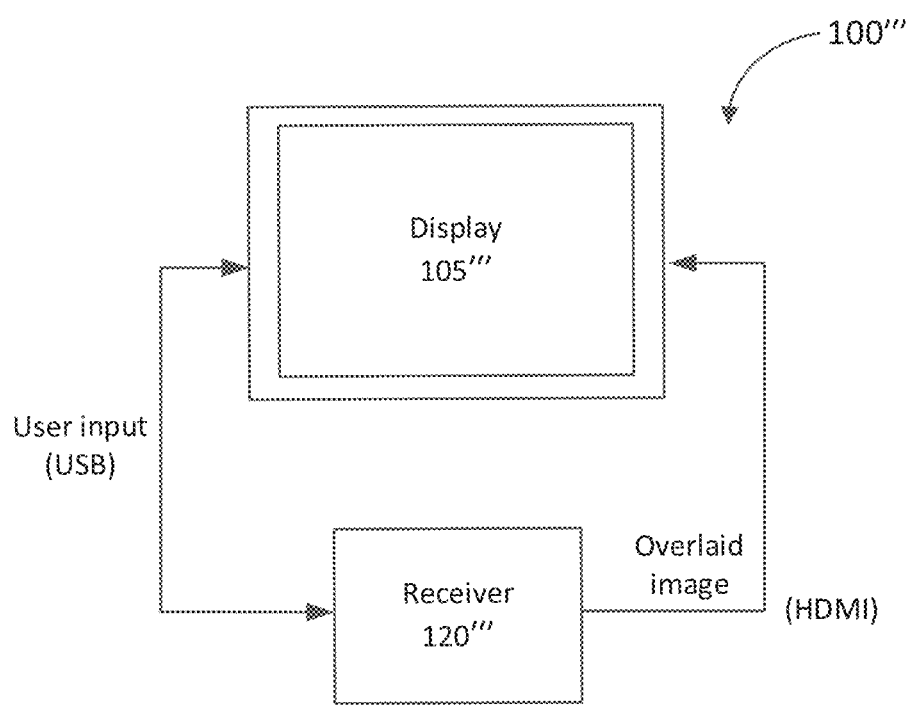
FIG. 12A is a block diagram of yet another alternative embodiment of the collaborative platform in accordance with yet another aspect of the present invention.

Referring now to FIG. 12A, a block diagram of another exemplary embodiment of collaborative platform 100''' in accordance with the principles of the present invention is provided. As shown in FIG. 12A, user input data may be transmitted from display 105''' to receiver 120''' via a wired connection, e.g., a USB cable, and/or a wireless connection such as Bluetooth. Receiver 120''' may be able to perform the functionalities of a moderator device described herein. For example, receiver 120''' may generate a real image based on the user input data received from display 105''', and further generate an overlay image including a predicted portion based on the user input data, as well as an overlaid image based on the overlay image and the real image. The overlaid image may be transmitted from receiver 120''' to display 105''' via a wired connection, e.g., an HDMI cable.

Figure 12B:
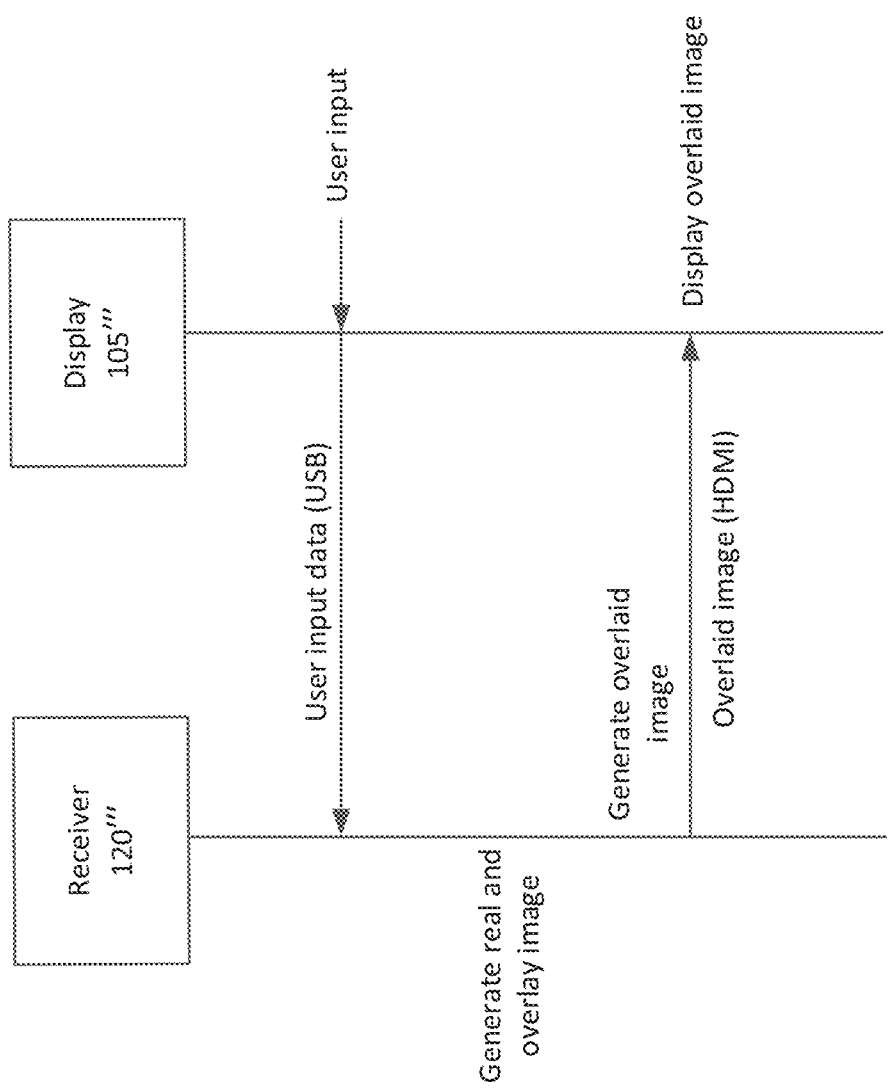
FIG. 12B is a sequence diagram for using the collaborative platform in accordance with the illustrative embodiment depicted in FIG. 12A.

Referring now to FIG. 12B, a sequence diagram for using collaborative platform 100''' depicted in FIG. 12A is provided. Collaboration platform 100''' of FIG. 12A may run a collaboration application for displaying a first image based on an original image file stored on receiver 120''', receiving user input, modifying the original image file stored on receiver 120''' based on the user input, and displaying a second image based on the modified original image file.

Like collaboration platform 100 of FIG. 4A, collaboration platform 100''' may run an overlay image generator application for generating an overlay image by receiver 120''' based on the user input provided by the user, including a predicted portion based on the user input data, generating an overlaid image based on the overlay image, and displaying the overlaid image on the original image on display 105''' to reduce latency of collaboration platform 100'''. Collaboration platform 100''' differs from collaboration platform 100 in that, receiver 120''' may function as a moderator device described herein and generate modified real images based on the user input data received from display 150''', without having to transmit the user input data to an external moderator device.

Accordingly, receiver 120''' generates a modified real image based on user input user input data and optionally user type data, generates an overlay image based on user input data and optionally user type data, generates an overlaid image based on the overlay image and the real image, and transmits the overlaid image via a wired connection, e.g., an HDMI cable, to display 105''' to be displayed over the original image displayed on display 105''', thereby reducing latency of collaborative platform 100'''.

The collaborative platforms described herein for generating overlaid images for display will reduce latency due to the necessity of transmitting data across a wireless network, e.g., between the receiver and the moderator and member devices. As will be understood by a person having ordinary skill in the art, additional sources of delay include processor and application delays. For example, the computing device for receiving user input, e.g., a touchscreen display, will be limited in its processing time of the user input to generate user input data for transmission to the receiver. In accordance with the principles of the present invention, extrapolation, artificial intelligence, machine learning, and/or neural networks may be implemented to predict user input as the user interacts with the touchscreen, such that the overlay image generator application of the receiver may generate overlaid images based on the predicted user input rather than waiting for the user input data from the touchscreen and/or the moderator device (which may suffer from application delays in processing the user input data), thereby further reducing latency of the collaborative platform.

It should be understood that any of the computer operations described herein above may be implemented at least in part as computer-readable instructions stored on a computer-readable memory. It will of course be understood that the embodiments described herein are illustrative, and components may be arranged, substituted, combined, and designed in a wide variety of different configurations, all of which are contemplated and fall within the scope of this disclosure.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. A method for reducing latency on a collaborative platform, the method comprising:
   receiving, by a first device, a first image from a third device;
   receiving, by the first device, first user input data indicative of a first user input on a second device at a first time;
   transmitting, by the first device, the user input data to the third device;
   determining, by the first device, an overlay image indicative of a predicted second user input based on the first user input data;
   determining, by the first device, an overlaid image based on the overlay image and the first image;
   transmitting, by the first device, the overlaid image to the second device to cause the overlaid image to be displayed on the second device; and
   receiving, by the first device, second user input data indicative of an actual second user input on the second device at a second time.

2. The method of claim 1, wherein determining, by the first device, the overlay image comprises determining, by the first device, a first portion of the overlay image indicative of the first user input on the second device based on the first user input data.

3. The method of claim 2, wherein determining, by the first device, the overlay image comprises predicting, by the first device, an extended portion of the overlay image based on the first user input data.

4. The method of claim 3, wherein predicting, by the first device, the extended portion of the overlay image based on the first user input data comprises predicting, by the first device, the extended portion of the overlay image based on at least one of spatial or time coordinates of the first user input data.

5. The method of claim 3, wherein predicting, by the first device, the extended portion of the overlay image based on the first user input data comprises predicting, by the first device, the extended portion of the overlay image based on a velocity of the first user input data.

6. The method of claim 3, wherein the extended portion of the overlay image comprises a curved portion comprising a plurality of finite line segments, and wherein predicting, by the first device, the extended portion of the overlay image comprises predicting the curved portion based on an angle of each finite line segment of the plurality of finite line segments.

7. The method of claim 3, wherein predicting, by the first device, the extended portion of the overlay image based on the first user input data comprises predicting, by the first device, the extended portion of the overlay image based on at least one of extrapolation, machine learning, artificial intelligence, or a neural network.

8. The method of claim 3, wherein determining, by the first device, the overlay image comprises determining, by the first device, the overlay image comprising the first and extended portions of the overlay image.

9. The method of claim 1, wherein a portion of the overlay image is displayed on the second device for a predetermined period of time.

10. The method of claim 9, wherein the predetermined period of time is at least as long as the latency on the collaborative platform.

11. The method of claim 1, wherein the overlay image comprises a leading end and a trailing end, such that, as a number of spatial coordinates of the leading end increases on the second device, a portion of spatial coordinates of the trailing end is removed from the second device depending on a length of the latency on a collaborative platform.

12. The method of claim 1, wherein the overlay image comprises a maximum amount of spatial coordinates, such that, when an additional spatial coordinate is displayed that exceeds the maximum amount of spatial coordinates, an initial displayed spatial coordinate is removed from the overlay image.

13. The method of claim 1, wherein the overlay image comprises a leading end, a trailing end, and a maximum spatial length, such that, as the leading end extends, the trailing end is removed to maintain the maximum spatial length of the overlay image of the overlaid image displayed on the second device.

14. The method of claim 1, wherein the overlay image comprises a leading end and a trailing end, such that, as the leading end extends on the second device at a rate, the trailing end is removed from the second device at the rate.

15. The method of claim 1, wherein the overlay image comprises a leading end and a trailing end, such that, as a number of spatial coordinates of the lending end increases on the second device, a portion of spatial coordinates of the trailing end is removed from the second device depending on a speed of the increasing spatial coordinates.

16. The method of claim 1, further comprising determining, by the first device, an input type corresponding to the first user input on the second device, wherein the input type comprises at least one of thickness, color, or marker or eraser type.

17. The method of claim 16, wherein determining, by the first device, the input type comprises determining, by the first device, the input type based on the first user input data and machine learning.

18. The method of claim 1, further comprising receiving, by the first device, data indicative of an input type corresponding to the first user input from the third device.

19. The method of claim 18, wherein receiving, by the first device, data indicative of the input type comprises receiving, by the first device, data indicative of the input type from an application running on the third device via a defined TCP port.

20. The method of claim 18, wherein receiving, by the first device, data indicative of the input type comprises receiving, by the first device, data indicative of the input type from an operating system running on the third device via a user input back channel (UIBC) extension.

* * * * *